United States Patent
Shei

(10) Patent No.: US 7,227,102 B2
(45) Date of Patent: Jun. 5, 2007

(54) FOOD WARMING APPARATUS AND METHOD

(75) Inventor: Steven M. Shei, Fort Wayne, IN (US)

(73) Assignee: Duke Manufacturing Company, St. Louis, MO (US)

( * ) Notice: Subject to any disclaimer, the term of this patent is extended or adjusted under 35 U.S.C. 154(b) by 45 days.

(21) Appl. No.: 10/611,295

(22) Filed: Jul. 1, 2003

(65) Prior Publication Data
US 2004/0020915 A1 Feb. 5, 2004

Related U.S. Application Data

(60) Provisional application No. 60/394,841, filed on Jul. 10, 2002.

(51) Int. Cl.
F24C 7/04 (2006.01)
F27B 5/02 (2006.01)
A47J 36/24 (2006.01)

(52) U.S. Cl. .............. 219/394; 219/411; 219/414; 219/492

(58) Field of Classification Search ............. 219/394, 219/400, 411, 412, 414, 492, 493; 99/478, 99/483, 474, 476
See application file for complete search history.

(56) References Cited

U.S. PATENT DOCUMENTS

| 466,416 | A | | 1/1892 | Hunt |
| 804,110 | A | | 11/1905 | Favorite et al. |
| 1,627,541 | A | * | 5/1927 | Katzinger ............... 126/376.1 |
| 2,076,091 | A | | 4/1937 | O'Neill |
| 2,257,468 | A | * | 9/1941 | Langel ..................... 249/204 |
| 2,779,497 | A | * | 1/1957 | Kollman et al. .......... 220/23.2 |
| 2,860,225 | A | * | 11/1958 | Steen ......................... 99/389 |
| 2,964,609 | A | * | 12/1960 | Anoff ....................... 219/394 |
| 3,051,582 | A | | 8/1962 | Muckler et al. |
| 3,313,917 | A | | 4/1967 | Ditzler et al. |
| 3,353,885 | A | | 11/1967 | Tompkins |
| 3,353,886 | A | | 11/1967 | Tompkins |
| 3,597,238 | A | * | 8/1971 | Scharre ..................... 426/107 |

(Continued)

FOREIGN PATENT DOCUMENTS

GB 829729 3/1960

OTHER PUBLICATIONS

International Search Report for PCT/US03/20857, Mar. 22, 2005, 3 pages.

*Primary Examiner*—Joseph Pelham
(74) *Attorney, Agent, or Firm*—Senniger Powers

(57) ABSTRACT

An oven for transferring heat to food in trays and a method for using the oven. The oven includes a cabinet with partitions dividing the interior into a plurality of separate, thermally isolated holding compartments each adapted for removably receiving a tray of food. Heat sources above the tray emit radiant heat to warm the food in the trays. A control mechanism controls the duration of the total hold time for the food having a duration of heated holding time during which a respective heat source is activated. The oven also includes a forced air mechanism under the control of the control mechanism for delivering forced air into the compartments. The heat sources are activated and deactivated during successive duty cycles to thereby to maintain the food in a respective compartment at a selected holding temperature for a duration of heated holding time.

92 Claims, 13 Drawing Sheets

U.S. PATENT DOCUMENTS

| | | | |
|---|---|---|---|
| 3,601,582 A | 8/1971 | Boisfleury | |
| 3,681,568 A | 8/1972 | Schaefer | |
| 3,751,629 A | 8/1973 | Eisler | |
| 3,752,640 A | 8/1973 | Schneider | |
| 3,908,749 A | 9/1975 | Williams | |
| 4,020,310 A | 4/1977 | Souder, Jr. et al. | |
| 4,024,377 A | 5/1977 | Henke | |
| 4,099,512 A * | 7/1978 | Noonan | 123/246 |
| 4,110,587 A | 8/1978 | Souder, Jr. et al. | |
| 4,154,861 A | 5/1979 | Smith | |
| 4,198,559 A | 4/1980 | Walter et al. | |
| 4,235,282 A | 11/1980 | Filippis et al. | |
| 4,337,384 A | 6/1982 | Tanaka et al. | |
| 4,374,319 A * | 2/1983 | Guibert | 219/400 |
| 4,381,442 A * | 4/1983 | Guibert | 219/400 |
| 4,467,777 A | 8/1984 | Weber | |
| 4,480,164 A | 10/1984 | Dills | |
| 4,587,946 A * | 5/1986 | Doyon et al. | 126/20 |
| 4,691,088 A | 9/1987 | Eke | |
| 4,784,054 A | 11/1988 | Karos et al. | |
| 4,967,995 A | 11/1990 | Burgess | |
| 4,972,824 A | 11/1990 | Luebke et al. | |
| 5,028,761 A | 7/1991 | Oda et al. | |
| 5,050,578 A | 9/1991 | Luebke et al. | |
| 5,172,682 A | 12/1992 | Luebke et al. | |
| 5,188,020 A | 2/1993 | Buchnag | |
| 5,235,903 A | 8/1993 | Tippmann | |
| 5,345,923 A | 9/1994 | Luebke et al. | |
| 5,365,038 A | 11/1994 | Mitsugu | |
| 5,434,390 A | 7/1995 | McKee et al. | |
| 5,496,987 A | 3/1996 | Siccardi et al. | |
| 5,653,905 A | 8/1997 | McKinney | |
| 5,699,722 A * | 12/1997 | Erickson et al. | 99/330 |
| 5,717,192 A | 2/1998 | Dobie et al. | |
| 5,724,886 A | 3/1998 | Ewald et al. | |
| 5,783,803 A | 7/1998 | Robards, Jr. | |
| 5,852,967 A * | 12/1998 | Fortmann et al. | 99/483 |
| 5,900,173 A | 5/1999 | Robards, Jr. | |
| 5,934,178 A | 8/1999 | Caridis et al. | |
| 5,945,018 A * | 8/1999 | Halen | 219/492 |
| 5,947,012 A | 9/1999 | Ewald et al. | |
| 6,011,243 A | 1/2000 | Arnold et al. | |
| 6,031,208 A | 2/2000 | Witt et al. | |
| 6,119,587 A | 9/2000 | Ewald et al. | |
| 6,175,099 B1 | 1/2001 | Shei et al. | |
| 6,209,447 B1 | 4/2001 | Ewald et al. | |
| 6,262,394 B1 | 7/2001 | Shei et al. | |
| 6,262,406 B1 | 7/2001 | McKee et al. | |
| 6,294,769 B1 * | 9/2001 | McCarter | 219/411 |
| 6,358,548 B1 | 3/2002 | Ewald et al. | |
| 6,376,817 B1 | 4/2002 | McFadden et al. | |
| 6,412,403 B1 * | 7/2002 | Veltrop | 99/483 |
| 6,450,085 B1 * | 9/2002 | Riesselmann | 99/327 |
| 6,539,846 B2 | 4/2003 | Citterio et al. | |
| 6,545,251 B2 * | 4/2003 | Allera et al. | 219/394 |
| 6,658,994 B1 * | 12/2003 | McMillan | 99/468 |
| 6,710,308 B2 * | 3/2004 | Sauter et al. | 219/490 |
| 2003/0047553 A1 * | 3/2003 | Patti et al. | 219/400 |

* cited by examiner

FOOD WARMING APPARATUS AND METHOD

CROSS REFERENCE TO RELATED APPLICATION

This application claims the benefit of U.S. Provisional Application No. 60/394,841, filed Jul. 10, 2002, titled HOLDING OR COOKING OVEN.

BACKGROUND OF THE INVENTION

This invention relates generally to ovens and more particularly to an oven for maintaining foods at temperatures suitable for serving or even for cooking food.

In one embodiment, this invention is especially (but not exclusively) directed to food service equipment that uses infrared (IR) heaters to maintain food at proper temperatures before serving, and even for cooking food. Such technology is often used in, for example, the fast food service industry to heat food. However, such equipment has certain disadvantages. For example, short holding times (e.g., one hour or less) and rapid product quality degradation often limit the effectiveness of this technology for holding applications. Additionally, different food products require different amounts of IR energy to be held in optimum condition. The quality of the food being held is affected in large part by the temperature and the air flow in the holding oven. As the food loses moisture due to evaporation, flavor is lost. This affects the texture and taste of the product. For example, chicken meat fibers will dry out and become tough, while the breading will become dry and greasy. French fries will develop a dry, rubbery texture as moisture is lost and the outer skin loses its crispness.

The frequency and duration of the heating cycles will normally depend upon the thermal mass of the food being cooked so as to provide relatively even temperature. Traditional IR holding devices cannot be adjusted to control the amount of IR energy delivered to the food and require a large amount of space since the IR heat source is in a fixed position relative to the food product.

U.S. Pat. Nos. 6,175,099, 6,262,394 and 6,541,739, assigned to Duke Manufacturing Co. of St. Louis, Mo. and incorporated herein by reference, are directed to a holding or cooking oven which is an improvement over prior designs and which has proven to be successful with various fried products. However, there is still a need for a technology that extends the holding time and quality of food products, especially fried products such as hash browns, French fries, rotisserie chicken, deep-fried chicken and shrimp.

SUMMARY OF THE INVENTION

Among the several objects of this invention will be noted the provision of an oven which is adapted for holding food longer without degradation of the quality of the product, including products having a crust which tends to become soggy or rubbery, such as fried potato products, fried chicken, and rotisserie chicken; and the provision of such an oven which allows evaporative losses to be more closely controlled to enhance food quality.

In general, one embodiment of the invention is an oven for transferring heat to food in trays, each tray having a bottom wall and side and end walls extending up from the bottom wall to an upper rim defining an open top of the tray. The oven includes a cabinet having an interior. The oven further includes partitions in the cabinet dividing the interior into a plurality of separate, thermally isolated holding compartments each adapted for removably receiving a tray of a plurality of trays. The oven also has heat sources above respective trays adapted for activation to emit radiant heat to the food in the trays to warm the food, and a control mechanism for controlling operation of the heat sources independent of one another whereby the temperature in each compartment may be independently controlled. In one embodiment, the control mechanism includes a timer control for setting a duration of holding time for each compartment independent of the other compartments, the duration of holding time comprising at least a duration of heated holding time during which a respective heat source is activated. In another embodiment, the oven also includes a forced air mechanism under the control of the control mechanism for delivering forced air into the compartments.

The invention is also directed to a method of controlling the operation of an oven. The oven comprises a cabinet, a plurality of separate, thermally isolated holding compartments in the cabinet, each compartment being adapted for removably receiving a tray for containing food, and a heat source above a respective tray for emitting radiant heat to the food in the tray to warm the food. The method includes activating and deactivating each heat source during successive duty cycles thereby to maintain the food in a respective compartment at a selected holding temperature for a duration of heated holding time, each duty cycle comprising a heating interval followed by a non-heating interval. In one embodiment of the invention, the method further includes the steps of placing a tray containing food at a temperature above the selected holding temperature into a respective compartment, maintaining the heat source in the compartment deactivated while the temperature in the compartment cools down to the selected holding temperature during a duration of non-heated holding time, and then activating and deactivating the heat source in the compartment during successive duty cycles thereby to maintain the food in the compartment at the selected holding temperature for the duration of heated holding time. In another embodiment, the method includes the steps of placing a tray containing food at a temperature below the selected holding temperature into a respective compartment, activating the heat source in the compartment to raise the temperature in the compartment to the selected holding temperature during a duration of rethermalizing holding time, and then activating and deactivating the heat source in the compartment during successive duty cycles thereby to maintain the food in the compartment at the selected holding temperature for the duration of heated holding time.

Another embodiment of the invention is directed to a method of controlling the operation of an oven. The oven comprises a cabinet, a plurality of separate, thermally isolated holding compartments in the cabinet, each compartment being adapted for removably receiving a tray for containing food, and heat sources above respective trays adapted for activation to emit radiant heat to the food in the trays to warm the food. The method includes setting a selected holding temperature for each compartment and setting a duration of holding time for each compartment, the duration of holding time comprising a duration of heated holding time. The method further includes activating each heat source during a respective duration of heated holding time thereby to maintain the food in a respective compartment at the selected holding temperature.

The invention is also directed to an oven comprising a cabinet having an interior for removably receiving a plurality of trays, and a plurality of covers covering the open tops of the trays. Each cover has a metallic portion overlying the top of a respective tray. The oven has a source for heating the metallic portion of each cover, and the metallic portion as thus heated emits radiant heat to the food in the respective tray to warm the food in the tray. At least some of the covers have one or more openings for venting moisture from each tray having such a cover.

The invention is also directed to a cover for covering a tray received in an oven having a heat source therein. Each tray has a bottom wall and side and end walls extending up from the bottom wall to an upper rim defining an open top of the tray. The cover comprises a metallic wall adapted to overlie the open top of a tray for receiving heat from the heat source and for emitting radiant heat to the food in the tray to warm it. The cover has one or more openings in it for venting moisture from the tray.

Other objects and features will be in part apparent and in part pointed out hereinafter.

BRIEF DESCRIPTION OF THE DRAWINGS

Corresponding parts are designated by corresponding reference numbers throughout the drawings.

DETAILED DESCRIPTION OF THE PREFERRED EMBODIMENT

Figure 1:
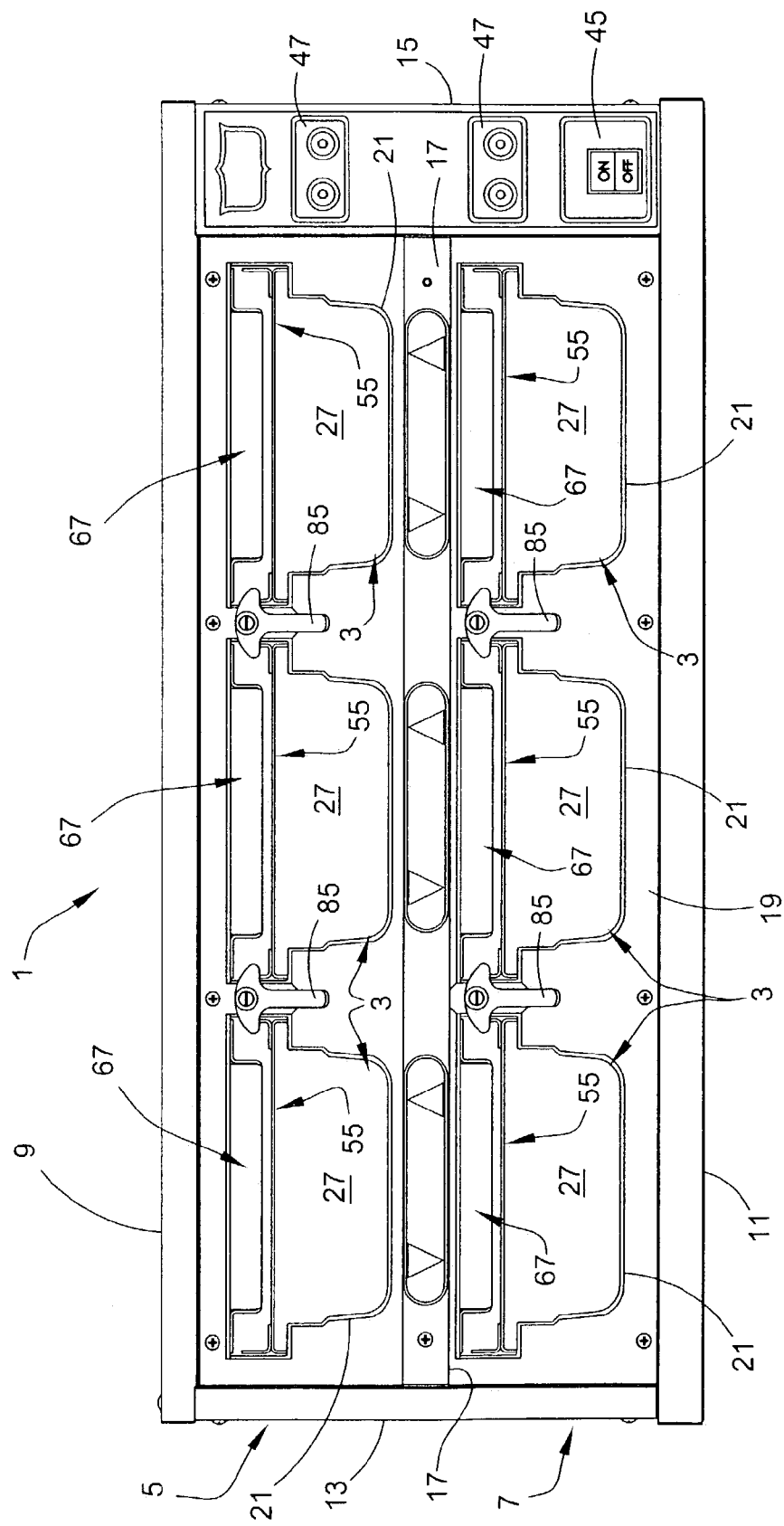
FIG. 1 is a front elevation of an oven of the present invention equipped with heat sinks for receiving food-containing trays, auxiliary heat sources mounted above the heat sinks,. and metallic covers for covering the trays (the trays being omitted from the view)

FIG. 1 illustrates one embodiment of an oven of the present invention, generally designated 1, comprising a cabinet having an interior 12 comprising a plurality of tiers for removably receiving a plurality of trays, each generally designated 3, the trays in each tier being disposed side-by-side. As shown, the oven has two tiers, an upper tier 5 and a lower tier 7, each accommodating three trays. It is to be understood that the number of tiers and the number of trays in each tier may vary.

The oven 1 has a top 9, bottom 11, sides 13 and 15, and a shelf 17 extending from one side to the other generally midway of the top and bottom. The shelf 17 and top 9 define the upper tier 5; the bottom 11 and shelf 17 define the lower tier 7. The oven has a front panel 19 and a corresponding rear panel (not shown) each having openings such as indicated at 21 for sliding each tray 3 either into or out of its respective tier front or rear.

Figure 2:
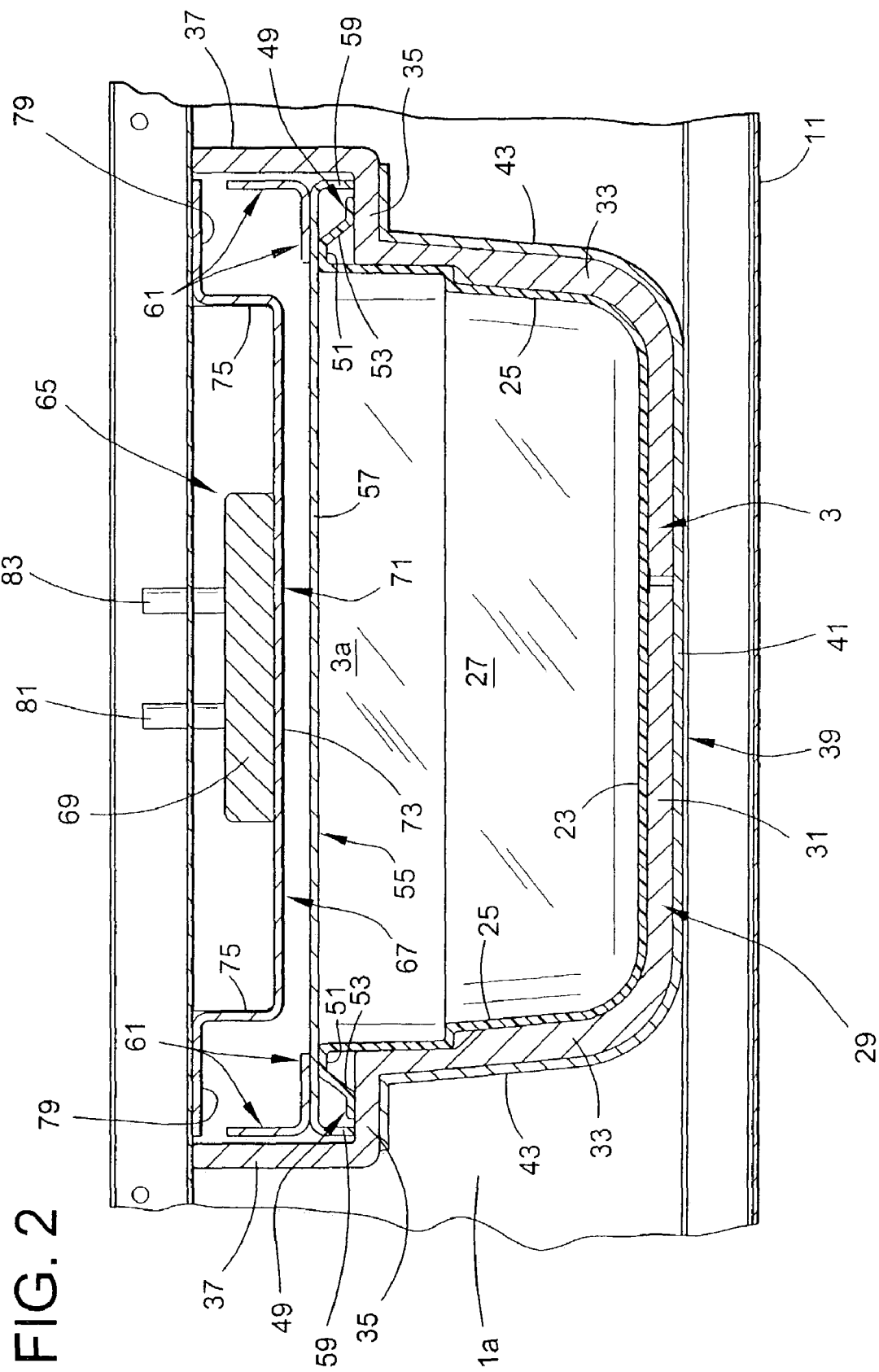
FIG. 2 is an enlarged sectional view of a portion of FIG. 1 but showing a tray positioned in a respective heat sink below its cover.
Figure 3:
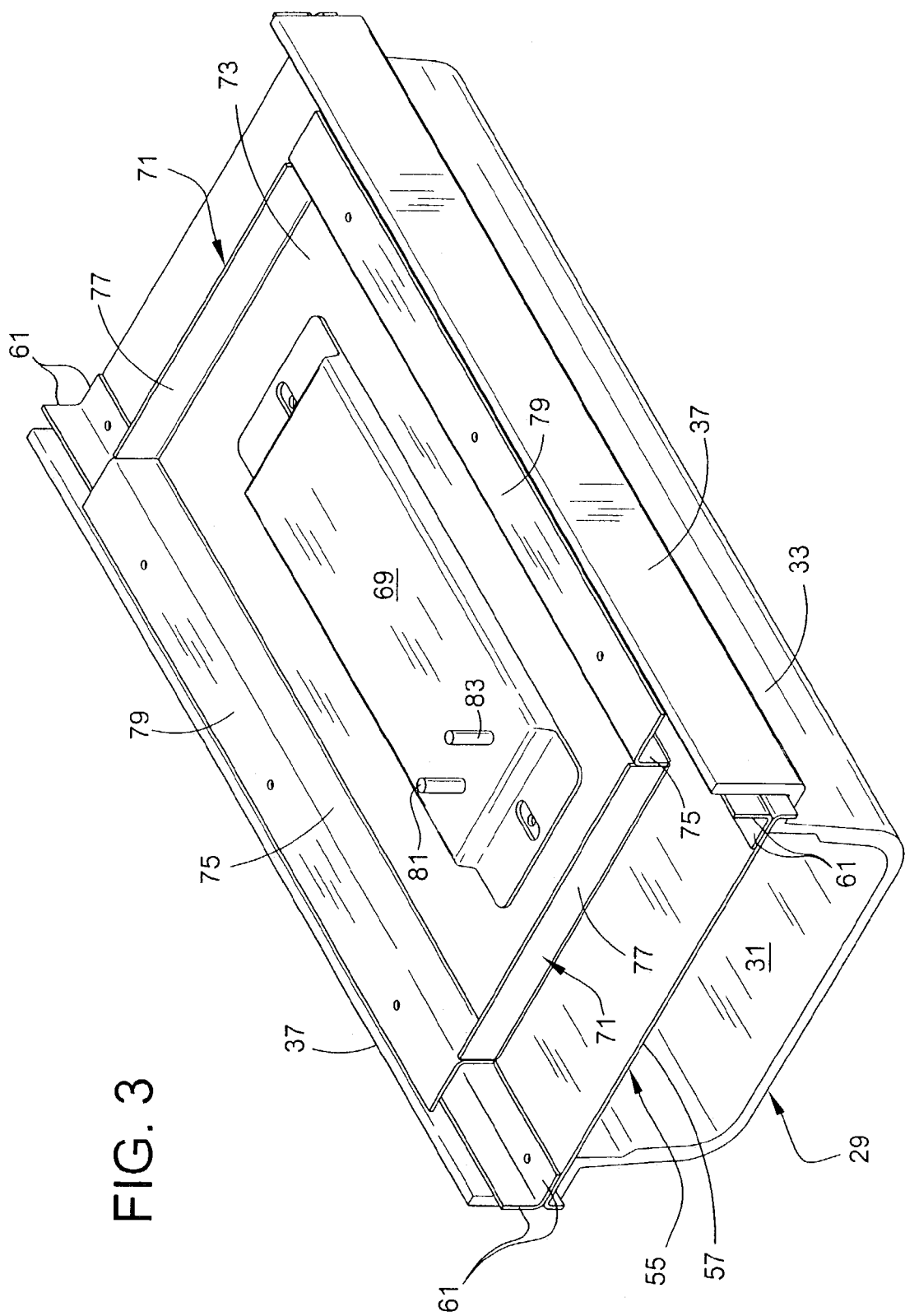
FIG. 3 is a perspective showing a heat sink, cover and auxiliary heat source.

In one embodiment, each tray 3 is generally rectangular in plan, having a bottom 23, opposite side walls each designated 25, and end walls each designated 27. Each tray is disposed in its respective tier 5, 7 in the oven 1 in a heat sink generally designated 29 extending from front to rear in the respective tier, being slidably disposed in its heat sink for being slidably withdrawn from or entered in the heat sink either front or rear through the respective opening 21. Each heat sink 29, which is made of aluminum, for example, has a bottom 31 and side walls each designated 33 (FIG. 2). The side walls 33 have outwardly (laterally) extending flanges 35 and rims 37 extending up from the outer margins of the flanges. Each heat sink constitutes a tray-receiving member for holding a single tray. An electrical resistance heating element generally designated 39 having a bottom component 41 contacting the bottom of the heat sink and upwardly extending side components 43 contacting the sides of each heat sink is provided for heating the heat sink and the tray 3 therein. Each heat sink 29 and associated heating element 39 constitutes the primary heating source for heating the respective tray 3 and its food content. At 45 is indicated an on-off electrical power control for all the heating elements 34. At 47, are indicated temperature controls for the heating elements 39 in the upper and lower tiers. The bottom component 41 of each heating element 39 in the upper tier 5 seats on shelf 17, the bottom component 41 of each heating element 39 in the lower tier 7 seats on the bottom 11 of the oven 1. The sides 43 of each heating element extend up to the flanges 35 of the respective heat sink 29. Reference may be made to U.S. Pat. Nos. 6,175,099 and 6,262,394, incorporated herein by reference, assigned to Duke Manufacturing Co. of St. Louis, Mo., for further details relating to the construction of the heat sink 29 and associated equipment.

Primary heating sources other than the heat sinks 29 and associated heating elements 39 can be used without departing from the scope of this invention.

Figure 4:
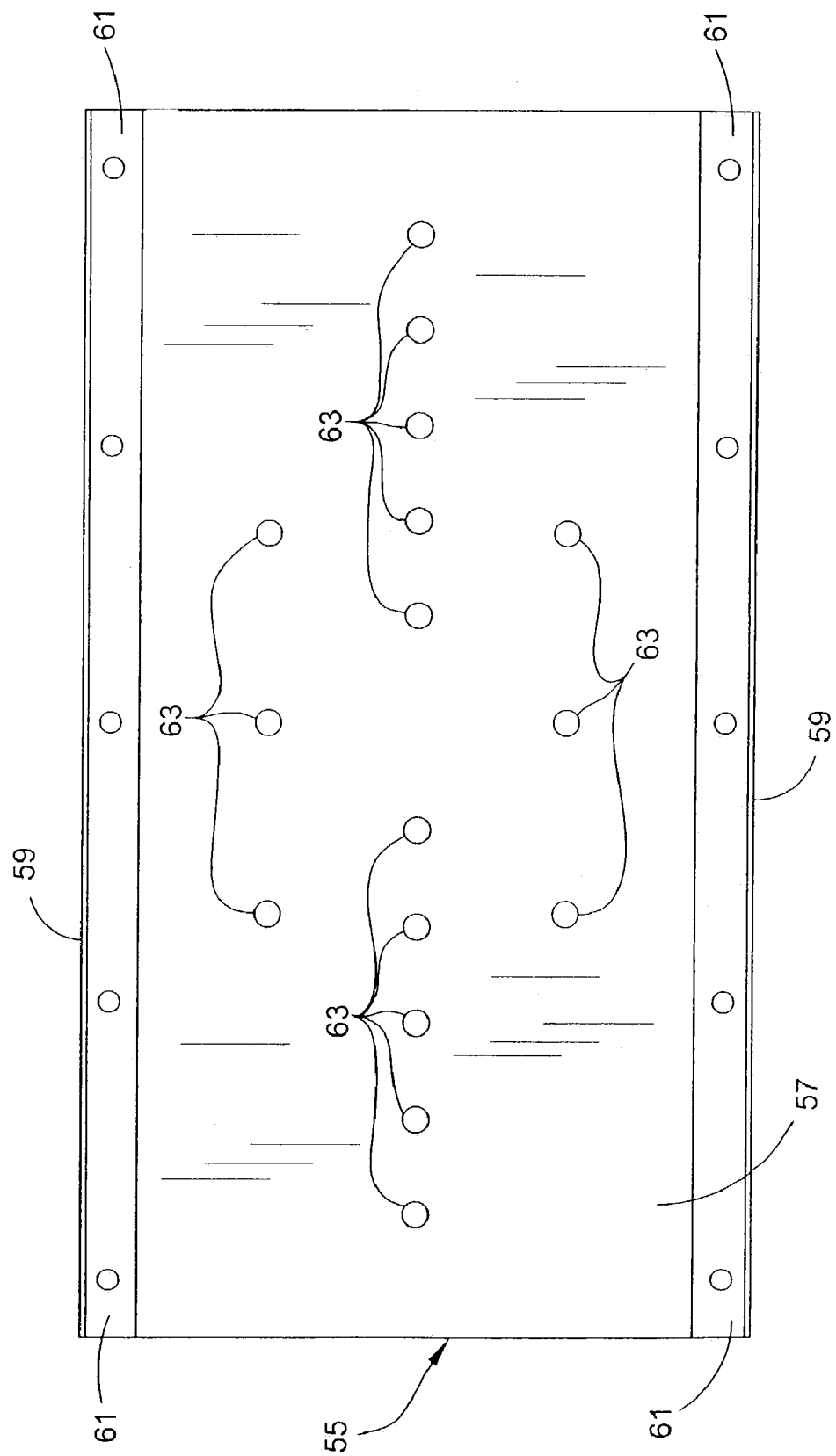
FIG. 4 is a plan of a cover per se.

In the preferred embodiment, each tray 3 has a rim 49 having an outwardly (laterally) directed upper part 51 with a downwardly extending angled lip 53 in sliding sealing engagement with the respective heat sink flange 35. The rim defines the open top 32 of the tray 3. A cover generally designated 55 is provided for the open top of each tray, each cover having a metallic portion 57 overlying the top of the respective tray. More specifically, the metallic portion 57 of each cover comprises a generally horizontal cross wall comprising a rectangular plate of anodized aluminum sheet, for example, having downturned flanges such as indicated at 59 at each side thereof and anodized metal angles 61 extending the length thereof on each side margin. The lower edges of the downturned flanges 59 engage the top of the heat sink flanges 35. One or more of the covers 55 is/are spaced above the rims 49 of respective trays 3 at a distance no greater than one inch, more preferably no greater than about 0.40 inch, and still more preferably no greater than about 0.30 in. One or more openings such as indicated at 63 is/are provided in at least one of the covers 55 for venting moisture from each tray having such an opening or openings. FIG. 4 shows a cover having sixteen openings 63 arranged in a pattern such as illustrated. The number and pattern may vary widely; the area of the one opening in a cover having one opening and the combined area of the openings in a cover having more than one opening is preferably less than about 25% of the area of the open top of the tray 3 it is covering, more preferably less than about 5% and even more preferably less than 1% thereof. The combined areas of the openings and the specific pattern of openings in a cover will vary depending on the type and quantity of food in the tray being covered. Whatever the circumstances, the size and pattern of the opening(s). can be selected to closely control the amount of moisture vented from the tray and thus optimize the conditions for maintaining food quality over an extended period of time.

Each cover 55 is part of a system generally designated 65 for heating the food in the respective tray in addition to the primary heat source, e.g., the respective heat sink 29 and heating element 39. This auxiliary heating system 65 comprises a heat source 67 for heating the metallic portion 57 of the respective cover 55 whereby the metallic portion is adapted to emit radiant heat to the food in the respective tray for additional warming of the food in the tray 3. Each heat source 67, which is located over the respective cover 55, comprises one electric heating element 69 or more disposed in a sheet metal housing 71 affixed to an interior surface of the oven or cabinet 1. In particular the heating element 69 is a commercial item, viz., a Chromalox electrical resistance heater element sold by Carlton Company of St. Louis, Mo. The housing 71 comprises a shallow pan of sheet metal such as aluminum having a rectangular bottom 73, sides 75, ends such as indicated at 77 and flanges 79 extending out from the top of the sides.

In one embodiment, the heating element 69 lies on the bottom 73 of the pan extending lengthwise thereof. It is suitably connected in an electrical circuit such that it is adapted to heat the respective cover 55 by heating the bottom 73 of the pan 71 with attendant emission of heat from the bottom of the pan to the cover. Terminals of the heating element for connection thereof in the aforesaid circuit are indicated at 81 and 83. The pans 71 are affixed in the oven or cabinet with the bottom 73 of each pan 71 spaced above the respective cover 55 a distance less than 2.0 inches and more particularly less than about 1.0 inch. In one embodiment, the power delivered by each heat source 67 to the respective cover 55 ranges from 100–500 watts, for example, and each heat source 67 is operable to heat each cover 55 to a temperature which preferably ranges from 200° to 500° F. Pivoted locks for locking the covers 55 in the oven 1 are indicated at 85.

Figure 5:
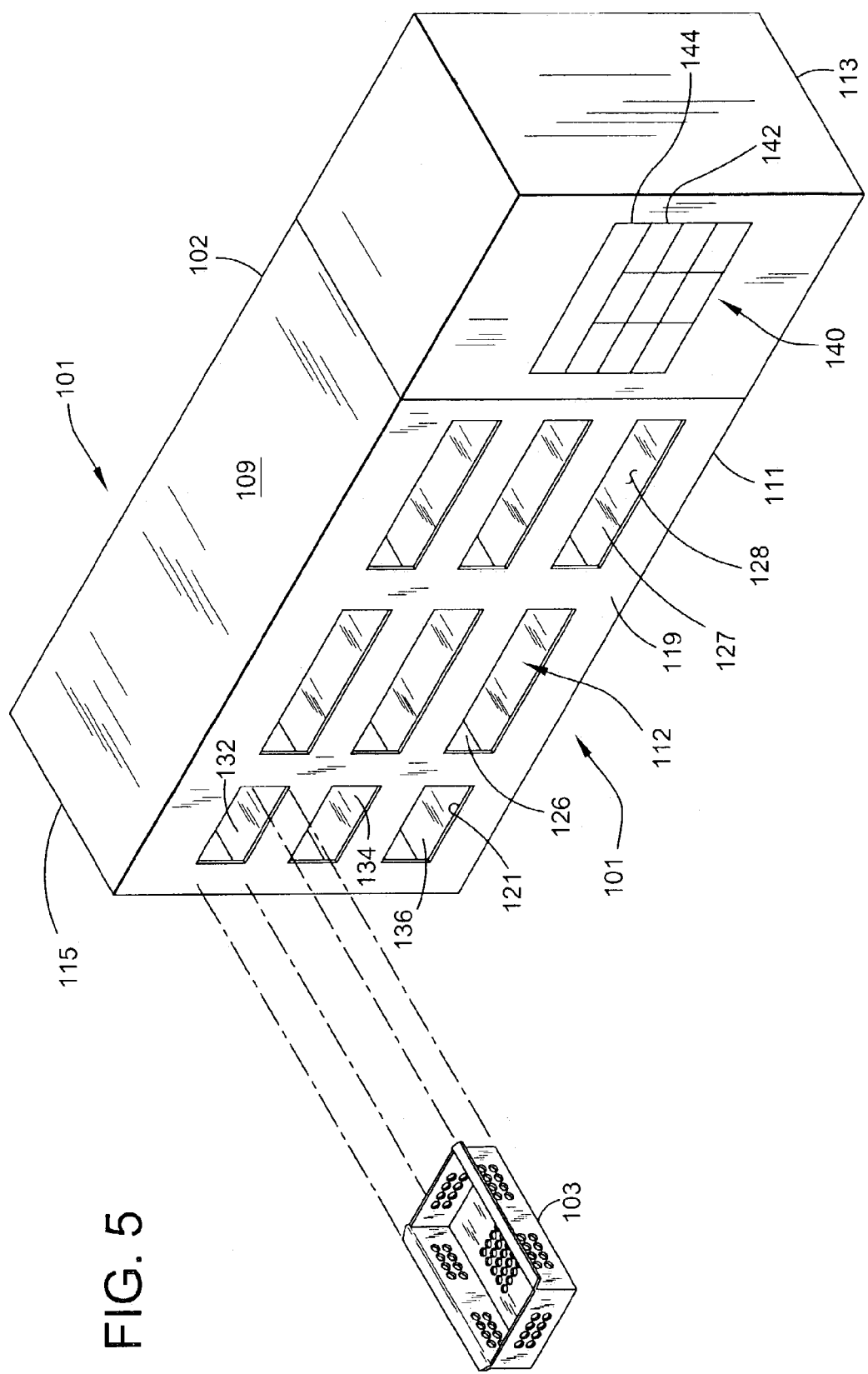
FIG. 5 is a front perspective view of another embodiment of an oven of the present invention equipped with compartments for receiving food-containing trays.

FIG. 5 illustrates a second embodiment of an oven of this invention, generally designated 101, comprising a generally rectangular or box-shaped cabinet 102. The cabinet 102 has a top 109, a bottom 111, opposite sides 113 and 115, a front panel 119 and a corresponding rear panel (not shown). The cabinet 102 defines an interior, generally designated 112, for removably receiving a plurality of trays, each generally designated 103. The oven 101 has vertical partitions 126 and horizontal partitions 127 within the cabinet 102 dividing the interior 112 thereof into a plurality of separate, thermally isolated holding compartments 128. It is to be understood that the number of vertical and horizontal partitions 126 and 127 (and thus the number of compartments 128) may vary. Preferably, the partitions 126 and 127 prevent the transfer of food flavors between the compartments 128.

The front panel 119 and rear panel contain openings, such as indicated at 121, in communication with each compartment 128. In one embodiment, the openings 121 in the front panel 119 have corresponding openings (not shown) formed in the rear panel such that each compartment 128 extends from front to rear of the oven 101 and is adapted for removably receiving one of the trays 103 from either the front or the back of the oven 101. The openings 121 are sized for sliding each tray 103 either into or out of the compartment 128.

Preferably, the compartments 128 and corresponding openings 121 are arranged in several tiers of compartments. As shown in FIG. 5, the oven has three horizontal tiers, an upper tier 132, a middle tier 134 and a lower tier 136. Each tier includes three compartments 128, with each compartment accommodating an individual tray 103. It is to be understood, however, that the number of tiers and the number of compartments in each tier may vary. In some embodiments, for example, it may be desirable to configure the oven 101 to have a single tier having two, three, or more compartments 128. Preferably, the entire cabinet 102 is fabricated of sheet metal material and a least the top 109, the bottom 111 and the sides 113 and 115 are of a dual wall construction to insulate the interior 112.

The oven 101 includes a control mechanism, generally indicated at 140, for controlling operation of the oven 101. Preferably, the control mechanism 140 has an operator input device, which in one embodiment, comprises a keypad, indicated by reference 142, and a display, indicated by reference 144, to selectively allow the operator to interact with the control mechanism to control the environment, such as the temperature and/or air flow, in each compartment 128. The control mechanism may include a separate keypad for each compartment 128. Alternately, the operator input device can include dials, switches and the like known to those in the art. For example, rotatably mounted control dials mounted on the front panel 119 and movable in a push-and-turn fashion to any user-selected positions can permit operator input to the control mechanism 140. The control mechanism 140 may also include associated indicator lights (not shown) to inform an operator of the status of a particular compartment 128 or the food within the compartment, such as whether the temperature in the compartment is at a desired temperature or whether the food in the compartment is approaching or has exceeded the desired hold time. Further operation of the control mechanism 140 will be described below.

Figure 6:
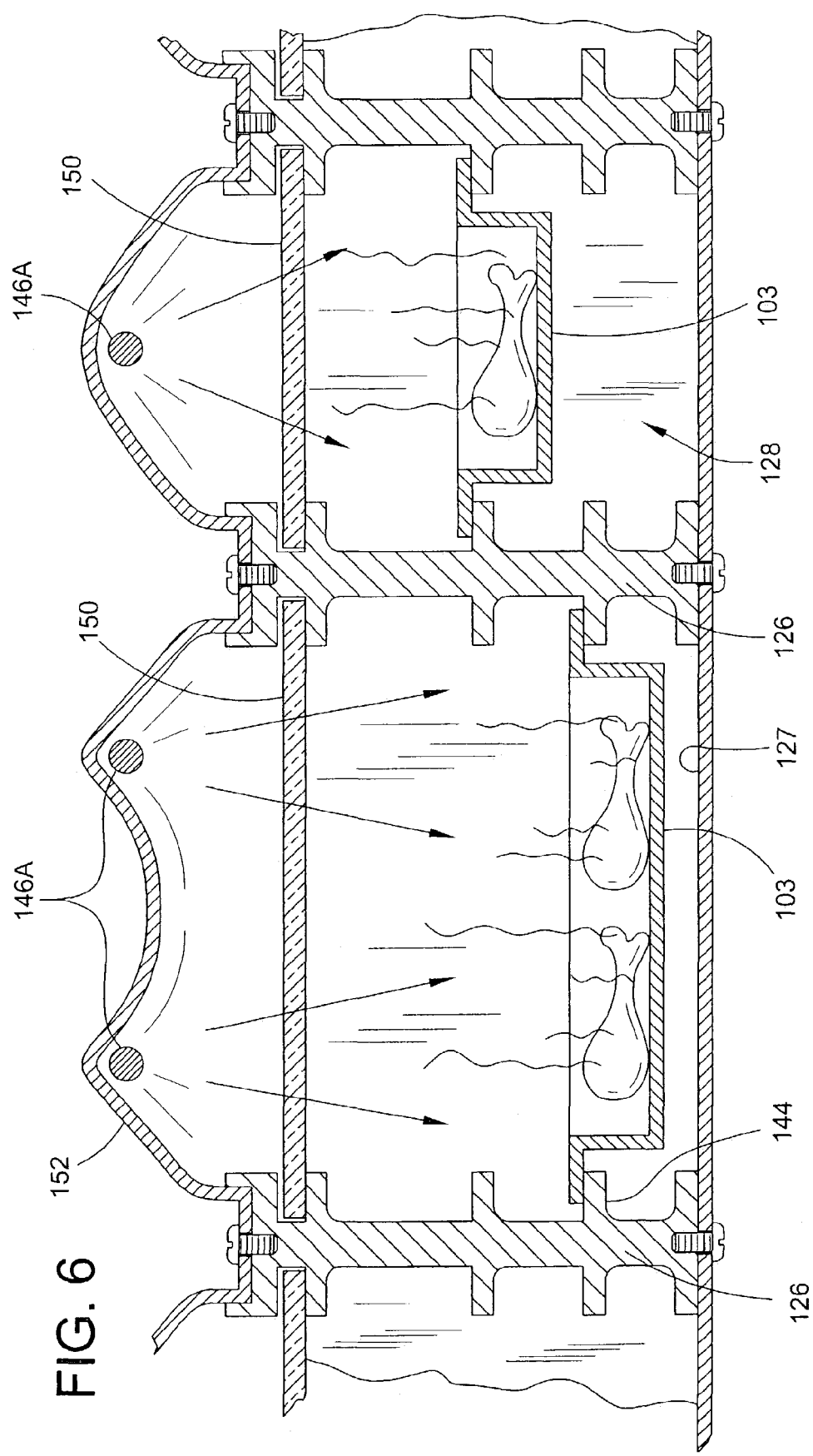
FIG. 6 is a sectional view of a portion of the oven of FIG. 5 showing trays positioned in respective compartments below heat sources.
Figure 7:
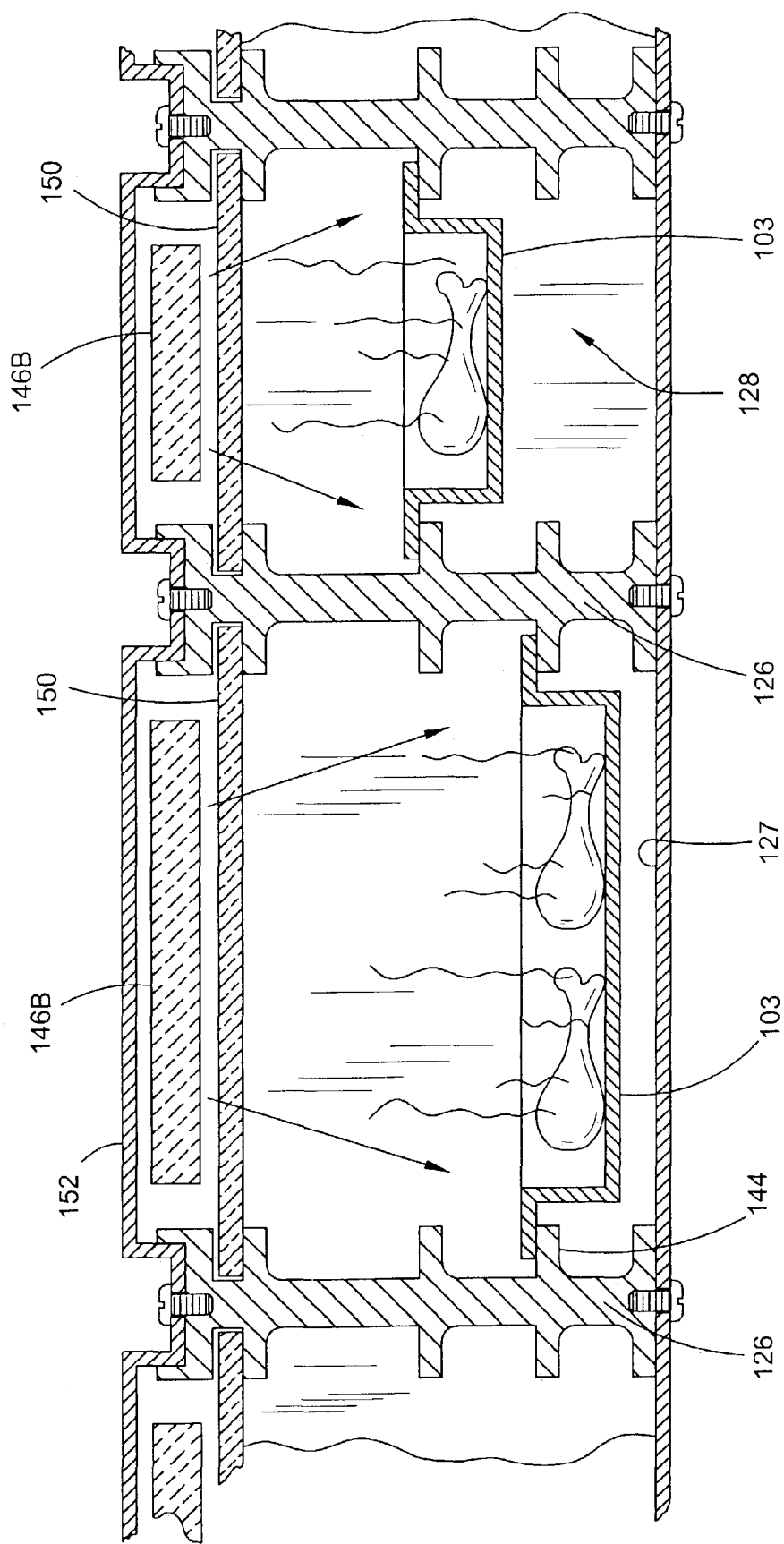
FIG. 7 is a sectional view of a portion of the oven similar to FIG. 6 showing trays positioned in respective compartments below alternate heat sources.
Figure 8:
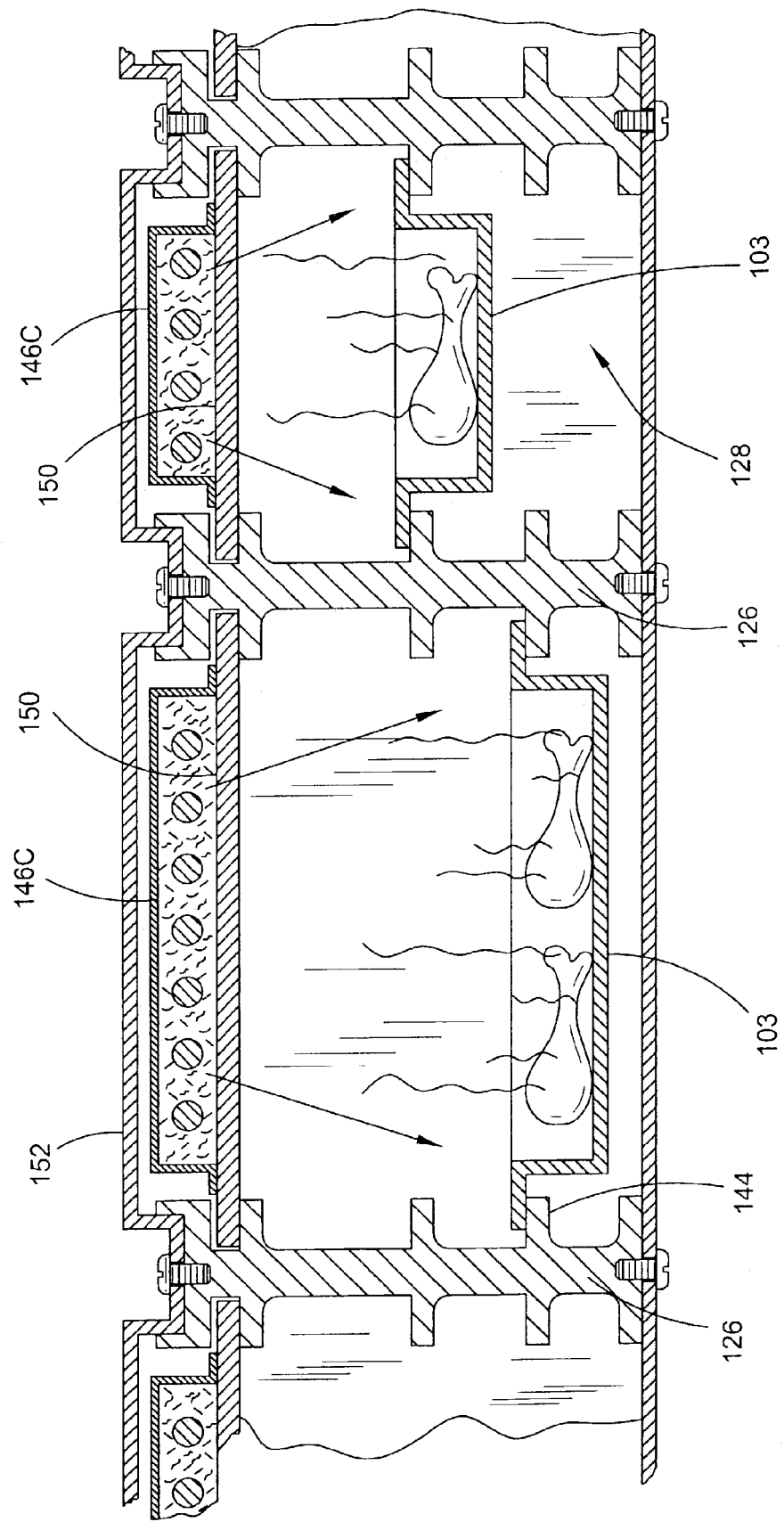
FIG. 8 is a sectional view of a portion of the oven similar to FIG. 6 showing trays positioned in respective compartments below alternate heat sources.

Referring to FIGS. 6–8, each compartment 128 has tray supports comprising, in one embodiment, inwardly (laterally) extending flanges 144 extending from the vertical partitions 126 at opposite sides of the compartment 128. The flanges 144 are vertically spaced for supporting a tray 103 at different elevations in the compartment 128. In one embodiment, the compartments 128 in the oven 101 have different widths and/or heights to accommodate trays of different sizes. It is contemplated that the tray supports can have other forms, such as grooves or slots in the vertical partitions 126.

Heat sources 146 positioned above respective compartments 128 are adapted to emit radiant heat into the compartments directed at the trays 103 to warm food contained therein. Each heat source 146 can function as the primary heating source for heating the respective tray 103 and cooking its food content or maintaining an already cooked food near a selected temperature. In the embodiment shown in FIG. 6, the heat source (designated 146A) is a quartz infrared heat source, but it will be understood that other heat sources may be used. For example, FIG. 7 illustrates ceramic infrared heat sources 146B and FIG. 8 illustrates resistance heating elements embedded in magnesium oxide 146C. Alternatively, halogen infrared heat sources or other sources may be used. The power delivered by each heat source 146 ranges from between about 20 and 2,000 watts, desirably between about 25 and 1500 watts, preferably between about 30 and 1000 watts, more preferably between about 35 and 750 watts and even more preferably between about 40 and 600 watts. In one embodiment, each heat source 146 delivers about 400 watts of power. Additional means for heating the oven 101 other than heat sources 146 can be used without departing from the scope of this invention. Reference may be made to the aforementioned U.S. Pat. Nos. 6,175,099, 6,262,394 and 6,541,739, for further details relating to the construction Of certain types of equipment used for heating the trays 103 and food contained therein.

In one embodiment, a panel 150 is positioned between each heat source 146 and its respective compartment 128 to prevent the trays 103 and their contents from contacting the heat sources. In one embodiment, the panel 150 is a tempered glass cover that permits radiant energy produced by the heat source 146 to pass through into the compartment 128. In this embodiment, the panel is preferably made from transparent or semi-transparent glass. Alternately, the panel 150 can be a radiant metallic plate. In this latter embodiment, the heat source 146 is used to heat the panel 150, and the panel then radiates heat to warm the contents of the tray 103. A reflector 152 is positioned above the heat source 146 to radiate heat down toward the tray 103 below it.

Figure 9:
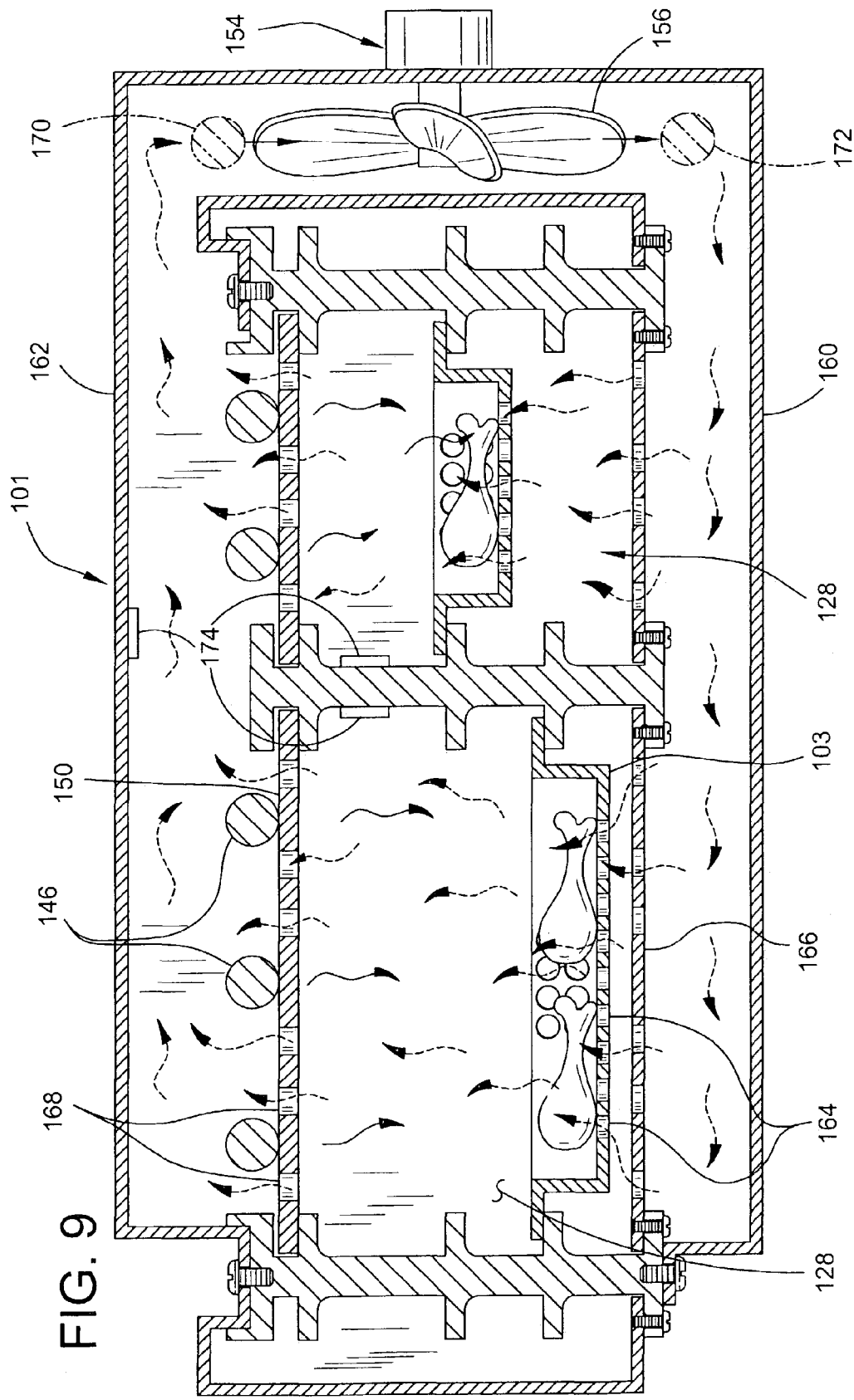
FIG. 9 is a sectional view of a portion of the oven of FIG. 5 showing a ventilation system of the oven according to an embodiment of the invention.

FIG. 9 illustrates an embodiment of the oven 101 having a forced air mechanism, indicated generally at 154, for delivering recirculating air into the compartments 128. The mechanism 154 comprises lower air ducting 160, upper air ducting 162, and a fan system 156 that moves air through the lower and upper air ducting air ducting. In one mode of operation, the fan system 156 circulates air in one direction along a flow path through the lower air ducting 160, into the compartments 128 and then through the upper air ducting 162 and back to the fan system. The lower air ducting 160 conveys the forced air into the compartments 128 through openings 164 located in a floor 166 of the compartments 128 below the trays 103. Air flows up from the compartments 128 into the upper air ducting 162 through one or more openings 168 in the panels 150 above the trays 103. In a second mode of operation, the fan system 156 moves air in the opposite direction through the upper air ducting 162, down into the compartments via openings 168, into the lower ducting 160 via openings 164, and then back to the fan system.

The number and pattern of openings 164, 168 in the panels 150 and floor 166 may vary widely depending on the type of heat source 146 used in each compartment 128 and the type of food in the compartment. The size and/or speed of the fan system 156 and/or the number, pattern and/or size of the openings 164, 168 associated with each compartment 128 can be varied to regulate the air flow around each tray 103 to provide optimum air flow for different food products. Additionally, the number, size and/or pattern of the opening(s) 164, 168 can be selected to closely control the amount of moisture vented from each compartment 128 and thus optimize the conditions. for maintaining food quality over an extended period of time.

An upper duct heat source 170 and a lower duct heat source 172 are positioned in the respective air ducting 162, 160 for heating air flowing along the selected flow path. The upper and lower duct heat sources 170, 172 heat the air that flows through the compartments so that, optionally, the food may also be warmed by convective heating. The duct heat sources 170, 172 are commercially available items, e.g., Chromalox electrical resistance heater element sold by Carlton Company of St. Louis, Mo. The duct heat sources 170, 172 may be used when additional heat is needed in the compartments 128, such as when the initial temperature is low or a large quantity of food is placed in the compartments. In one embodiment, temperature sensors 174 (FIG. 9), such as conventional resistive thermal detector type sensors known to those skilled in the art, may be positioned in each of the compartments 128 or in the air ducting 162, 160. The temperature sensors 174 provide feedback to the control mechanism 140, for example, to supply an indication of the temperature to the display 144, to control the operation of the fan system 156, or to provide indications to a warning system (not shown) that the temperature has exceeded a selected threshold. The forced air mechanism 154 can also provide recirculating air for forced cooling of the food stored in the compartment 128. FIG. 9 illustrates an oven with a single tier and a single forced air mechanism 154, but ovens 101 with multiple tiers can have separate fan systems with associated air ducting 160, 162 for each tier within the scope of the invention.

The air flow over the food in the tray 103 is controlled to enable an operator to control the amount of moisture that evaporates from the food. When the air flow direction is from the bottom to the top, i.e., from the lower air ducting 160 through the compartment 128 and into the upper air ducting 162, convection heat is applied to the food in the tray from below the tray, and infrared heat is applied from the heat sources 146 above the tray 103. By changing the direction of air flow so that air flows from top to bottom, the food can be cooked or held with a combination of convection heat and infrared heat directed from above the tray 103. Depending on the food in the tray, air flow can be maintained continuously from one direction, e.g., always from bottom to top, throughout the cook/hold cycle. Alternately, the direction of the air flow can be reversed during the cook/hold cycle so that air flow is alternately directed from the bottom and from the top of the food product. In one embodiment, the forced air mechanism 154 supplies air while the heat sources 146 are activated and is turned off when the heat sources are deactivated.

Figure 10:
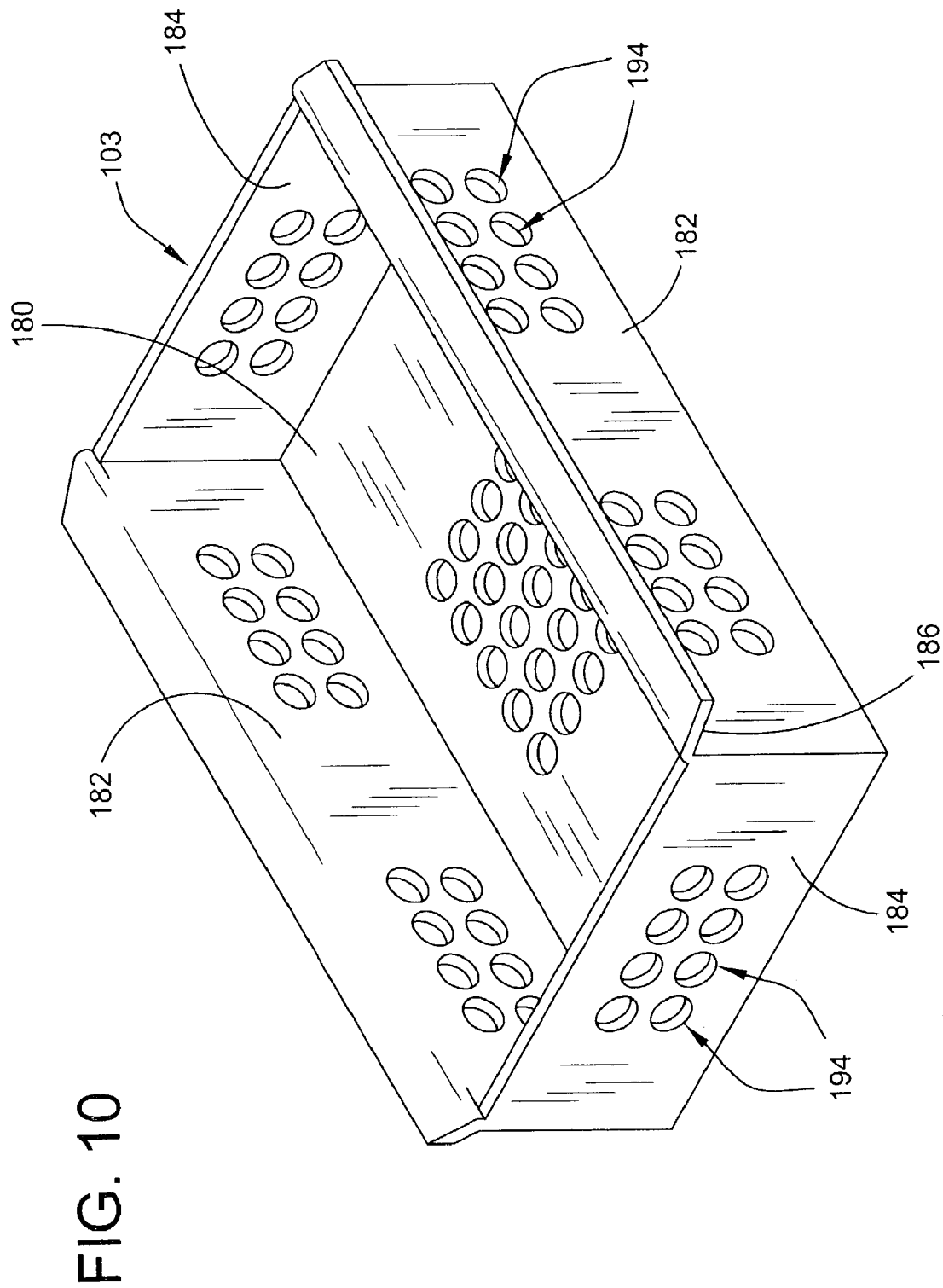
FIG. 10 is a perspective view of one embodiment of a tray used with the oven of FIG. 5.

Referring now to FIG. 10, each tray 103 is generally rectangular in plan, having a bottom 180, opposite side walls each designated 182, end walls each designated 184, and an open top. As shown, each tray 103 has a rim 186 comprising a pair of laterally extending lips 190 adapted for sliding sealing engagement with the respective support flanges 144 in a compartment. One or more openings such as indicated at 194 is/are provided in at least one of the bottom 180 and/or the side walls 182 and end walls 184 for allowing air to circulate through the tray 103 to vent moisture from each tray. FIG. 10 shows a tray having sixteen openings 194 in the bottom 180 and each side wall 182 and 8 openings 194 in each end wall 184 arranged in a pattern such as illustrated. It is contemplated that the number, pattern and size of openings 194 may vary widely. For example, the openings 194 in the tray 103 may be circular, oval, square or other shape and each opening may have an area of between about 0.1 and about 1.0 square inch. It is desirable that the combined area of the openings 194 in the tray is less than about 50% of the area of the open top of the tray 103, preferably less than about 25% and more preferably less than about 10% thereof. Also, it is contemplated that different trays 103 within the oven 101 may have different patterns of openings 194. The combined areas of the openings 194 and/or the specific pattern of openings in the tray 103 will vary depending on the type and quantity of food in the tray 103. Whatever the circumstances, the size and pattern of the opening(s) 194 can be selected to closely control the amount of moisture evaporated from the tray 103 and thus optimize the conditions for maintaining food quality over an extended period of time.

The control mechanism 140 is used to selectively control the environment, such as the temperature and/or air flow, in each compartment 128 of the oven 101. As will be described more fully hereafter, the control mechanism 140 comprises suitable timer and duty cycle controls to control the length of the duty cycle of each heat source 146, the term "duty cycle" meaning the ratio of heat source on-time to heat source on-time plus heat source off-time. The control mechanism 140 uses a suitable microprocessor and appropriate software to control relays 198 (FIG. 11) that activate the heat sources 146, 170 and 172 and fans 156.

Figure 11:
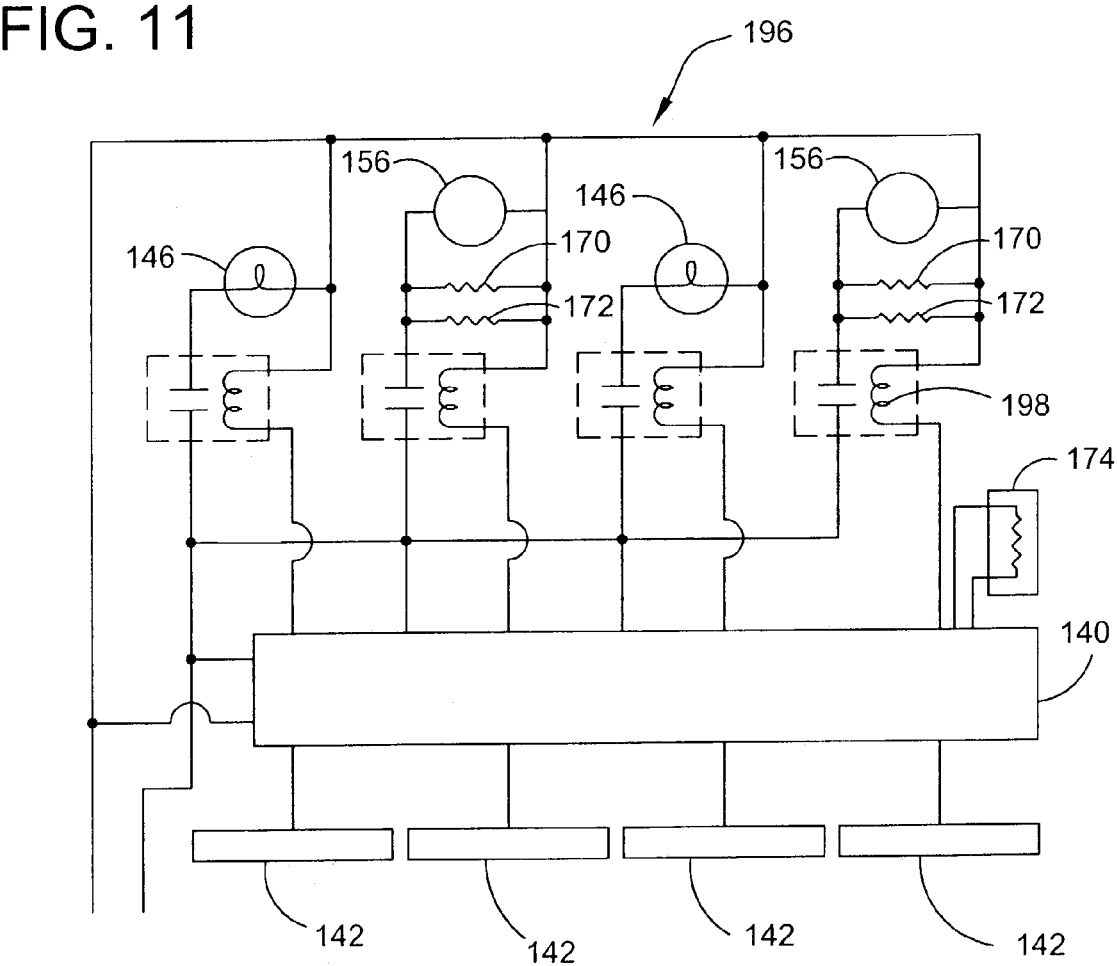
FIG. 11 is a schematic diagram of one embodiment of a control circuit of the oven of FIG. 5.

FIG. 11 is a simplified schematic of a portion of one embodiment of an oven control circuit, generally indicated at 196, that is controlled by the control mechanism 140. The circuit 196 operates the heat sources 146 in the multiple compartments 128 of the oven and the heat sources 170, 172 in the upper and lower ducting 160, 162. In the embodiment shown, the control mechanism 140 regulates the heat sources in the oven 101 by energizing conventional relays 198. It is understood that the control mechanism 140 may independently operate the heat sources 146 in the compartments 128, such that the heat source 146 for one compartment may be actuated while the corresponding heat source for another compartment is at a different level of activation or deactivated. Additionally, the control mechanism 140 may independently operate the upper and lower duct heat sources 170, 172 such that neither, one or both heat sources in a flow path may be operating, and such that, for example, the top heat source may be operated in one tier while the bottom heat source may be operated in another tier. Using a keypad 142 or other suitable operator input device, the control mechanism 140 can be programmed to control the heat sources 146, 170 and 172 to adjust various parameters, such as, for example, the ambient hold time, the heated hold time, the total hold time, the percentage heater on time, the time base of the duty cycle, the cook or rethermalization time, and/or the temperature, as more fully described below. As such, the control mechanism 140 controls operation of the heat sources 146 independent of one another so that the temperature in each compartment 128 may be independently controlled.

Typically, the oven 101 will operate in at least two modes. In a first "cool down and hold" mode, the initial temperature of the food placed in the oven is higher than the desired holding temperature of the food, as where the food has just been cooked. In this mode, the control mechanism 140 is operable to maintain the heat source in a respective compartment 128 deactivated while the food in the compartment 128 cools down to the selected holding temperature during a duration of non-heated holding time, and for then activating and deactivating the heat source 146 in the compartment 128 to maintain the food in the compartment 128 at or near the selected holding temperature for a duration of heated holding time. In a second "heat up and hold" or "rethermalizing" mode, the initial temperature of the food placed in the oven is lower than the desired holding temperature of the food, as where the food has been refrigerated. In this mode, the control mechanism 140 is operable to activate the heat source in the compartment 128 to raise the temperature in the compartment 128 to the selected holding temperature during a duration of rethermalizing holding time, and for then activating and deactivating the heat source 146 in the at least one compartment 128 to maintain the food in the compartment 128 at the selected holding temperature for the duration of heated holding time. It will be understood that the oven 1 of FIG. 1 can be used in a similar manner without departing from the scope of the invention.

Figure 12:
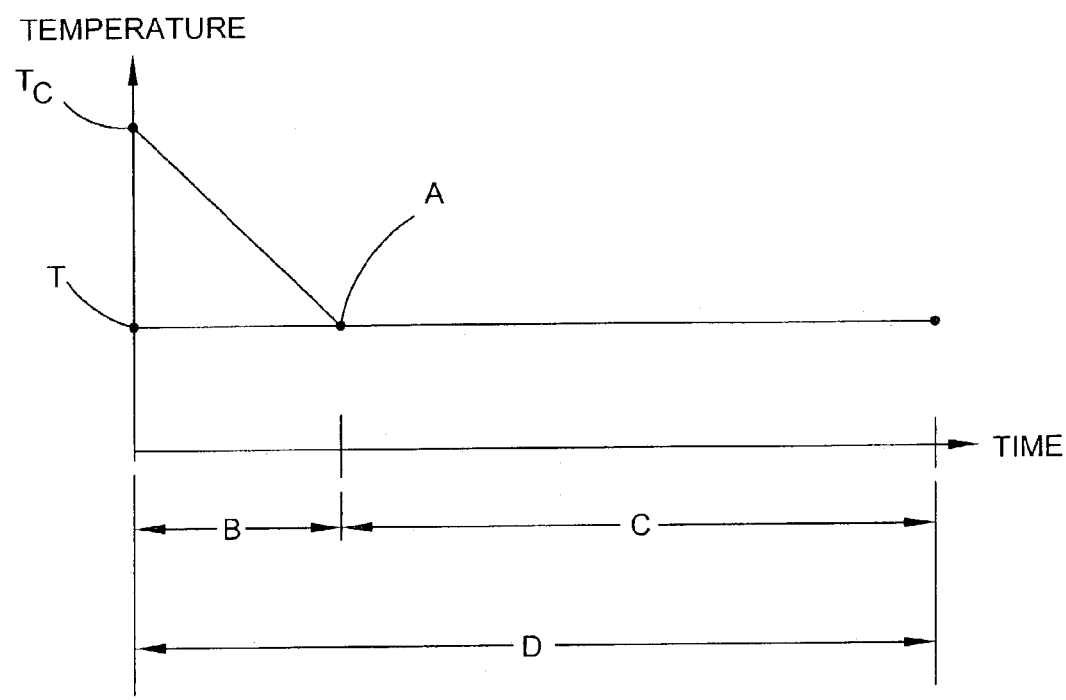
FIG. 12 is a diagram of a time vs. temperature curve illustrating one mode of operation of the oven of FIG. 5.
Figure 13:
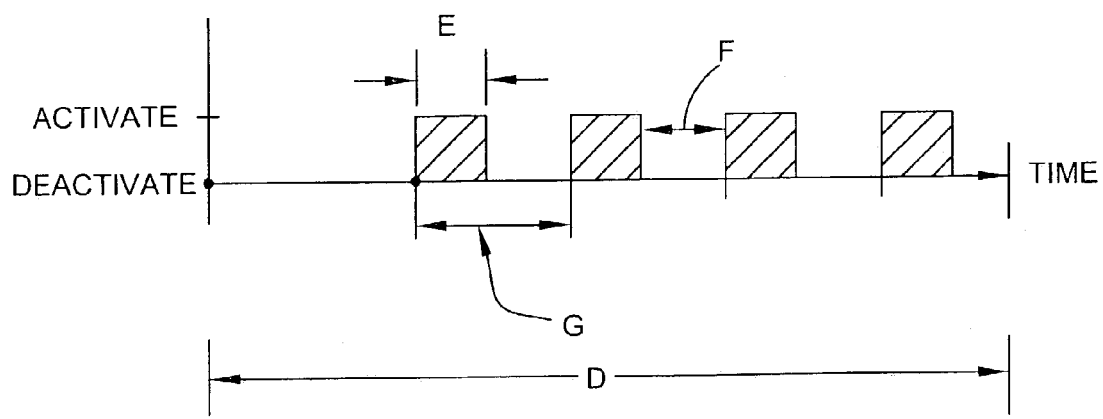
FIG. 13 is a time vs. heat source activation curve for the mode of operation depicted in FIG. 12.

FIGS. 12 and 13 illustrate an example of the operation of the oven 101 in the first (cool down and hold) mode. In particular, FIG. 12 illustrates a time vs. temperature curve for a complete hold cycle D for one compartment 128 of the oven 101, and FIG. 13 illustrates a time vs. activation curve for the heat source 146 of that same compartment during the hold cycle D. The time vs. temperature curve of FIG. 12 plots the temperature of the food product as a function of time. One skilled in the art will understand that this curve can be different for each type of food product to be held in the oven 101.

In a cool down and hold situation, a food product is typically cooked, such as by frying, grilling, baking, etc., until a desired high internal temperature, usually between about 170 and 210 degrees Fahrenheit (° F.), is achieved. The food product is placed in tray 103 and inserted into compartment 128 in the oven 101. Using the keypad 142 or other input device, the operator selects a desired holding temperature, indicated at T, which will be lower than the temperature Tc of the food initially placed in the compartment. The holding temperature T is the desired temperature for maintaining the food to preserve taste, appearance and/or other food quality. The operator also selects a duration of total hold time D. The total hold time D is the total time the food is to be held in the oven 101 and maintained at a desired quality level. Alternatively, the control mechanism 140 can be programmed so that the operator need only select the type of food to be placed in the compartment and the control mechanism 140 automatically uses preselected settings for that type of food.

The duration of total hold time D may comprise an ambient hold time, i.e., a period of non-heated cool-down time such as indicated at B in FIG. 12, during which time the food product is allowed to cool to the desired holding temperature T. Preferably, during the ambient hold time B, heat source 146 is in a deactivated state so that the food product may cool down more rapidly. The food product is allowed to cool for the ambient hold time B until it reaches the desired hold temperature T as illustrated at point A. In one embodiment, forced air flow from the forced air mechanism 154 (FIG. 9) can be used to more rapidly decrease the temperature. After the internal temperature of the food decreases to the desired hold temperature T, the food is held near the desired hold temperature to preserve food quality for a period of heated hold time, indicated at C, comprising the remaining duration of the total hold time (hold cycle) D. During the heated holding time C, the heat source 146 is operated in duty cycles to apply heat to the compartment 128. Additionally, the control mechanism 140 controls the heat sources 170, 172 and the fan system 156 to maintain the internal food temperature at or near the desired hold temperature T during the heated hold time C.

Referring to FIG. 13, the heat source 146 is successively activated and deactivated in a controlled sequence or duty cycle, indicated at G, to maintain the temperature in the compartment 128 near the selected holding temperature T. Each duty cycle G comprises a heating interval E during which time the heat source 146 is activated followed by a non-heating interval F during which time the heat source is deactivated. The time-base of the duty cycle G is the time required to complete one cycle of activation and deactivation of the heat source 146 as shown in FIG. 13. In one embodiment, the time-base of the duty cycle G and the percent on time of the heat source 146 (i.e., the duration of heating interval E divided by the time-base of the duty cycle G expressed as a percent) maintains the actual temperature within the compartment 128 within at least about 15 degrees of the desired temperature, preferably within at least about 10 degrees, more preferably within about 5 degrees, and even more preferably within about 2 degrees of the desired temperature.

The operator is able to set various parameters using the keypad 142 or other input device of the control mechanism 140, such as the ambient hold time delay B, the heating interval E, the time-base of the duty cycle G, and/or total hold time D. These parameters can be selected by the operator or preset for the type of food product in the compartment 128 so that the operator need only select the proper food product. The control mechanism 140 in an oven 101 having more than one compartment 128 can control the duty cycle of the heat source 146 in each compartment to maintain the temperatures in the compartments at different levels.

Using the keypad 142 or other input device, an operator can also control the operation of the forced air mechanism 154 (FIG. 9) by activating the fan system 156 or selecting the direction of forced air flow. In one embodiment, forced air flow from the forced air mechanism 154 conveys convective heating air into the compartments 128 at locations below the trays 103 for flow in a generally upward direction toward the trays 103. Alternately, the ventilation system conveys heating air into the compartments 128 at locations above the trays 103 for flow in a generally downward direction toward the trays 103. The fan system 156 can be operated such that heating air is circulated through the compartments 128 in one direction and then the direction of air flow is reversed to circulate heating air through the compartments 128 in the opposite direction. Using the keypad 142 or other input device of the control mechanism 140, the operator is able to select the duration that the fan system 156 circulates air through the compartments 128. For example, in one embodiment, the forced air mechanism 154 operates in a controlled sequence during the duty cycle G such that the fan system 156 is activated when the heat sources 146 are activated and is deactivated when the heat sources are deactivated. Alternately, the fan system 156 can be continuously activated for the duration of the total hold time D or can be activated so that the fan system is on a desired percentage of the duty cycle G independent of the heat sources. Preferably, the fan system 156 is activated a suitable percentage of the time to control the evaporation of moisture from the food in the compartment 128. The percentage of time the fan system 156 is activated desirably depends on the type and/or the amount of food placed in the compartment 128. The percentage of time the fan system 156 is activated and the direction of air flow can be selected by the operator or preset for the type of food product in the compartment 128 so that the operator need only select the proper food product. Additionally, the vertical position of at least one tray 103 in a respective compartment 128 may be varied.

Set forth below are exemplary oven settings for particular food products when the oven is operating in a cool down and hold mode.

EXAMPLE 1

Fried Chicken Nuggets

| | |
|---|---|
| Ambient hold time delay (B) = | 10 minutes |
| Hold temperature (T) = | 180° F. |
| Time-base of duty cycle (G) = | 120 seconds |
| Percent on time (E) = | 50% |
| Total hold time (D) = | 60 minutes |

EXAMPLE 2

Fried Apple Turnover

| | |
|---|---|
| Ambient hold time delay (B) = | 25 minutes |
| Hold temperature (T) = | 200° F. |
| Time base of duty cycle (G) = | 120 seconds |
| Percent on time (E) = | 40% |
| Total hold time (D) = | 240 minutes |

Figure 14:
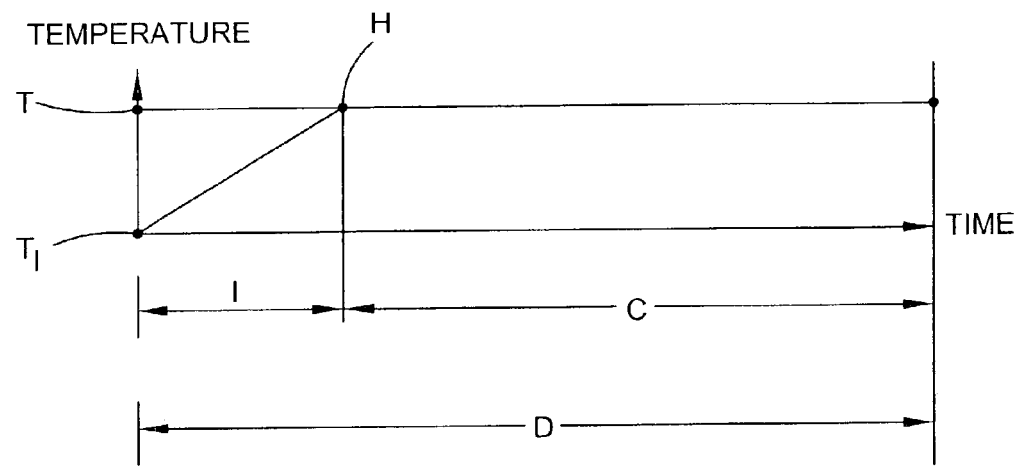
FIG. 14 is a diagram of a time vs. temperature curve illustrating a different mode of operation of the oven of FIG. 5.
Figure 15:
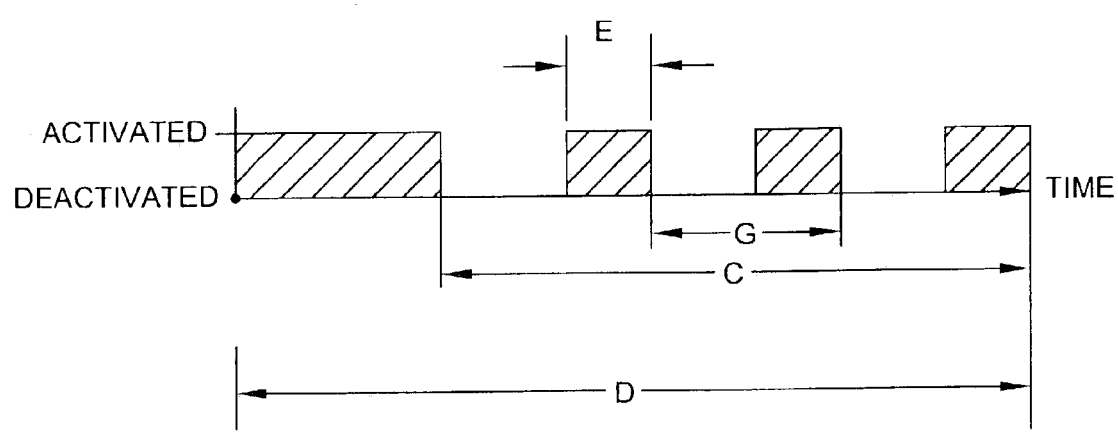
FIG. 15 is a time vs. heat source activation curve for the mode of operation depicted in FIG. 14.

FIGS. 14 and 15 illustrate an example of the operation of the oven 101 in the second (heat up and hold or rethermalizing) mode. In particular, FIG. 14 illustrates a time vs. temperature curve for a complete hold cycle D for one compartment 128 of the oven 101, and FIG. 15 illustrates a time vs. activation curve for the heat source 146 of that same compartment during the hold cycle D. The time vs. temperature curve of FIG. 14 plots the temperature of the food product as a function of time. One skilled in the art will understand that this curve can be different for each type of food product to be held in the oven 101.

In this mode, the oven 101 is used to raise the temperature of a food product to a selected temperature and hold the food product at the selected temperature. A tray 103 containing a food product at an initial temperature $T_I$ is placed into the compartment 128. (Temperature $T_I$ may vary from a frozen or refrigerated temperature to ambient or above.) Using the keypad 142 or other. input device, the operator selects a desired holding temperature T (which will be higher than the initial food temperature $T_I$), and a duration of total hold time D. Alternatively, the control mechanism 140 can be programmed so that the operator need only select the type of food to be placed in the compartment and the control mechanism 140 automatically uses preselected settings for that type of food. In either case, the control mechanism is operable to activate the heat source 146 to raise the temperature of the food product for a duration of heat-up or rethermalization time, indicated at I, the food reaching the holding temperature T at time H. The heat source 146 is then activated and deactivated during the heated holding time C for successive duty cycles G to maintain the food in the compartment 128 at the selected holding temperature T for the duration the total hold time D. Preferably, the duration of the heated holding time C includes intervals of the duty cycle G when the heat source 146 is activated as indicated by E and intervals during which the heat source is deactivated as indicated by F as described above.

Set forth below are exemplary oven settings for particular food products when the oven is operating in a heat-up and hold mode.

EXAMPLE 3

Diced Frozen Chicken

| | |
|---|---|
| Rethermalization time (I) = | 40 minutes |
| Hold temperature (T) = | 220° F. |
| Time-base of duty cycle (G) = | 180 seconds |
| Percent on time (E) = | 50% |
| Total hold time (D) = | 160 minutes |

EXAMPLE 4

Refrigerated Beef BBQ

| | |
|---|---|
| Rethermalization time (I) = | 30 minutes |
| Hold temperature (T) = | 210 ° F. |
| Time base of duty cycle (G) = | 180 seconds |
| Percent on time (E) = | 30% |
| Total hold time (D) = | 240 minutes |

With the heating system of the present invention and the capability of controlling the evaporation of moisture from the trays 103, the holding time (D) for fast service cooked foods such as chicken and french fries is substantially increased, and good texture and taste are maintained. In this respect, controlling the rate of evaporation of moisture from chicken, for example, precludes drying out and toughening of the chicken fibers and precludes the breading from becoming dry and greasy. And with respect to french fries, for example, development of a dry, rubbery texture as moisture is lost and the outer skin loses crispness is precluded.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. In combination with a plurality of trays for holding pre-cooked food having been previously cooked in a cooking appliance, each tray having a bottom wall and side and end walls extending up from the bottom wall to an upper rim defining an open top of the tray, a food holding oven for holding pre-cooked food at a selected food holding temperature, said food holding oven comprising:
   a cabinet having an interior;
   partitions in the cabinet dividing said interior into a plurality of separate, thermally isolated holding compartments each being sized for removably receiving only one tray of said plurality of trays;
   a plurality of heat sources in said compartments above said trays adapted for activation to emit radiant heat to the food in the trays to warm the food; and
   a control mechanism for controlling operation of the heat sources independent of one another whereby the food holding temperature in each compartment may be independently controlled.

2. A combination as set forth in claim 1 wherein said control mechanism comprises a timer control for setting a duration of holding time for each compartment independent of the other compartments, said duration of holding time comprising at least a duration of heated holding time during which a respective heat source is activated.

3. A combination as set forth in claim 2 wherein said duration of holding time comprises the sum of said duration of heated holding time and a duration of non-heated holding time during which a respective heat source is not activated.

4. A combination as set forth in claim 1 wherein said control mechanism is operable to activate and deactivate at least one of said heat sources during successive duty cycles thereby to maintain the food in a respective compartment at a selected holding temperature for a duration of heated holding time, each duty cycle comprising a heating interval followed by a non-heating interval.

5. A combination as set forth in claim 4 wherein said control mechanism comprises a duty-cycle control for controlling the length of the heating interval of a duty cycle.

6. A combination as set forth in claim 4 wherein said control mechanism comprises a temperature control for selecting the holding temperature in each compartment.

7. A combination as set forth in claim 6 wherein said control mechanism is operable to deactivate the heat source in at least one compartment while the temperature of the food in said compartment cools down to said selected holding temperature during a duration of non-heated holding time, and for then activating and deactivating the heat source in said at least one compartment during said successive duty cycles thereby to maintain the food in the compartment at said selected holding temperature for said duration of heated holding time.

8. A combination as set forth in claim 7 further comprising a forced air mechanism for delivering cooling air into the compartments, said control mechanism being operable to activate the forced air mechanism during said duration of non-heating holding time.

9. A combination as set forth in claim 7 wherein said control mechanism comprises a timer control for setting a duration of holding time for each compartment independent of the other compartments, said duration of holding time comprising at least a duration of heated holding time during which a respective heat source is activated.

10. A combination as set forth in claim 9 wherein said timer control is operable for setting a duration of holding time comprising the sum of said duration of non-heated holding time and said duration of said heated holding time.

11. A combination as set forth in claim 6 wherein said control mechanism is operable to activate the heat source in at least one compartment to raise the temperature in the compartment to said selected holding temperature during a duration of rethermalizing holding time, and for then activating and de-activating the heat source in said at least one compartment during said successive duty cycles thereby to maintain the food in the compartment at said selected holding temperature for said duration of heated holding time.

12. A combination as set forth in claim 11 wherein said control mechanism comprises a timer control for setting a duration of holding time comprising at least said duration of holding time comprising at least a duration of heated holding time during which a respective heat source is activated.

13. A combination as set forth in claim 12 wherein said timer control is operable for setting a duration of holding time comprising the sum of said duration of rethermalizing holding time and said duration of said heated holding time.

14. A combination as set forth in claim 1 further comprising a forced air mechanism under the control of said control mechanism for delivering forced air into the compartments.

15. A combination as set forth in claim 14 wherein said forced air mechanism comprises lower air ducting for conveying forced air into the compartments at locations below the trays in the compartments.

16. A combination as set forth in claim 15 wherein said forced air mechanism comprises upper air ducting for conveying forced air out of the compartments at locations above the trays in the compartments.

17. A combination as set forth in claim 16 wherein said forced air mechanism further comprises a fan system operable in a first mode to circulate air in one direction along a flow path comprising said lower air ducting, said compartments and said upper air ducting, and in a second mode to circulate air in an opposite direction along said flow path.

18. A combination as set forth in claim 17 further comprising heat sources positioned in at least one of said upper and lower air ducting for heating air flowing along said flow path.

19. A combination as set forth in claim 18 wherein said control mechanism further comprises temperature sensors in the compartments for sensing the temperatures in the compartments, said control mechanism being operable in response to signals from said temperature sensors to control the operation of said fan system.

20. A combination as set forth in claim 19 wherein said trays have holes therein for allowing forced air entering the compartments to flow through the holes and thereby remove moisture from the food therein.

21. A combination as set forth in claim 1 wherein said partitions prevent the transfer of food flavors between the compartments.

22. A combination as set forth in claim 1 wherein said control mechanism is operable to control operation of each heat source to deliver heat to the food in a respective tray to warm the food to a selected holding temperature, and then to vary the amount of heat delivered to the food to hold the food at said selected holding temperature.

23. A combination as set forth in claim 22 wherein said control mechanism comprises an operator input device for selecting a type of food to be placed in said compartment, and wherein said control mechanism is programmed for operating the heat source according to a predetermined protocol depending on the type of food selected.

24. A combination as set forth in claim 1 wherein said control mechanism is programmed to operate said heat source according to a predetermined protocol to vary said heat delivered to said food depending on the type of food placed in the compartment.

25. A combination as set forth in claim 1 wherein said control mechanism comprises an operator input device for selecting a type of food placed in a respective compartment, and wherein said control mechanism is programmed to operate a respective heat source to heat the food in said respective compartment to a preselected holding temperature, and then to hold the food at said preselected holding temperature.

26. A combination as set forth in claim 25 wherein said control mechanism is responsive to said operator input device to operate the heat source to hold the food at said preselected holding temperature for a preselected holding duration.

27. A combination set forth in claim 1 wherein said control mechanism comprises an operator input device for selecting a type of food to be placed in said compartment, and wherein said control mechanism operates said heat sources in successive time-based duty cycles according to a predetermined protocol depending on the type of food selected.

28. A combination set forth in claim 27 wherein said control mechanism operates said heat sources according to a predetermined protocol to vary said heating interval and said non-heating interval based on the type of food placed in a respective compartment.

29. A combination as set forth in claim 27 wherein each duty cycle comprises a time-base defined by the total time for the heating interval and the non-heating interval, said control mechanism comprising an operator input device for selecting said time-base.

30. A combination as set forth in claim 27 wherein each duty cycle comprises a time-base defined by the total time for the heating interval and the non-heating interval, said time-based being preset according to a type of food placed in the holding oven.

31. A method of controlling the operation of a food holding oven, said oven comprising a cabinet, a plurality of separate, thermally isolated holding compartments in the cabinet, each compartment being adapted for removably receiving a tray for containing pre-cooked food having been previously cooked in a cooking appliance, and a heat source above a respective tray for emitting radiant heat to the food in the tray to warm the food, said method comprising activating and deactivating each heat source during successive time-based duty cycles thereby to maintain the food in a respective compartment at a selected holding temperature for a duration of heated holding time, each duty cycle comprising a predetermined heating interval during which the heat source is activated followed by a predetermined non-heating interval during which the heat source is deactivated.

32. A method as set forth in claim 31 further comprising varying the length of the heating interval of a duty cycle.

33. A method as set forth in claim 31 further comprising maintaining at least two compartments at different selected holding temperatures.

34. A method as set forth in claim 31 further comprising placing a tray containing food at a temperature above said selected holding temperature into a respective compartment, deactivating the heat source in the compartment while the food in the compartment cools down during a duration of non-heated holding time, and then activating and deactivating the heat source in said at least one compartment during said successive duty cycles thereby to maintain the food in the compartment at said selected holding temperature for said duration of heated holding time.

35. A method as set forth in claim 34 further comprising delivering cooling air into the compartments during said duration of non-heating holding time.

36. A method as set forth in claim 34 further comprising placing a tray containing food at a temperature below said selected holding temperature into a respective compartment, activating the heat source in the compartment to raise the temperature in the compartment to said selected holding temperature during a duration of rethermalizing holding time, and then activating and deactivating the heat source in said at least one compartment during said successive duty cycles thereby to maintain the food in the compartment at said selected holding temperature for said duration of heated holding time.

37. A method as set forth in claim 31 further comprising setting a duration of holding time for each compartment independent of the other compartments, said duration of holding time comprising at least a duration of heated holding time during which a respective heat source is activated.

38. A method as set forth in claim 37 wherein said duration of holding time comprises the sum of said duration of heated holding time and a duration of non-heated holding time during which a respective heat source is not activated.

39. A method as set forth in claim 31 further comprising conveying convective heating air into the compartments.

40. A method as set forth in claim 39 further comprising conveying said convective heating air into the compartments at locations below the trays for flow in a generally upward direction toward said trays.

41. A method as set forth in claim 39 further comprising conveying said convective heating air into the compartments at locations above the trays for flow in a generally downward direction toward said trays.

42. A method as set forth in claim 39 further comprising circulating heating air through the compartments in one direction and then reversing the direction of air flow to circulate heating air through the compartments in a different direction.

43. A method as set forth in claim 31 further comprising varying the vertical position of at least one tray in a respective compartment.

44. A method as set forth in claim 31 wherein the food is placed in the compartment at a temperature less than ambient temperature, and wherein said method further comprising activating the heat source to deliver heat to the food until the food reaches said selected holding temperature, and then varying the amount of heat delivered to the food to maintain the food at said selected holding temperature.

45. A method as set forth in claim 44 wherein said method further comprising programming said oven to heat the food in each compartment to a selected holding temperature which varies depending to the type of food placed in the compartment.

46. A method as set forth in claim 31 wherein each duty cycle has the same heating interval and the same non-heating interval.

47. A method as set forth in claim 31 further comprising programming said oven to operate said heat source according to a predetermined protocol to vary said heating interval and said non-heating interval based on the type of food placed in a respective compartment.

48. A method as set forth in claim 31 wherein each duty cycle comprises a time-base defined by the total time for the heating interval and the non-heating interval, said method further comprises selecting said time-base.

49. A method as set forth in claim 31 wherein each duty cycle comprises a time-base defined by the total time for the heating interval and the non-heating interval, said method further comprising programming said oven to operate according to a preset time-base according to a type of food placed in the oven.

50. A method of controlling the operation of a food holding oven, said oven comprising a cabinet, a plurality of separate, thermally isolated holding compartments in the cabinet, a plurality of trays for containing pre-cooked food having been previously cooked in a cooking appliance, each compartment being sized for removably receiving only one tray per compartment, and heat sources above respective trays adapted for activation to emit radiant heat to the food in the trays to warm the food, said method comprising:

placing at least one tray of said plurality of trays in the oven such that only one tray is received in a respective compartment;

setting a selected holding temperature for each compartment;

setting a duration of holding time for each compartment, said duration of holding time comprising a duration of heated holding time; and activating each heat source during a respective duration of heated holding time thereby to maintain the food in a respective compartment at said selected holding temperature.

51. A method as set forth in claim 50 wherein said duration of holding time comprises the sum of said duration of heated holding time and a duration of non-heated holding time during which a respective heat source is not activated.

52. A method as set forth in claim 50 further comprising placing a tray containing food at a temperature above said selected holding temperature into a respective compartment, deactivating the heat source in the compartment while the temperature in the compartment cools down to said selected holding temperature during a duration of non-heated holding time, and then activating and deactivating the heat source in said at least one compartment during successive duty cycles thereby to maintain the food in the compartment at said selected holding temperature for said duration of heated holding time.

53. A method as set forth in claim 52 further comprising delivering cooling air into the compartments during said duration of non-heating holding time.

54. A method as set forth in claim 53 further comprising placing a tray containing food at a temperature below said selected holding temperature into a respective compartment, activating the heat source in the compartment to raise the temperature in the compartment to said selected holding temperature during a duration of rethermalizing holding time, and then activating and deactivating the heat source in said at least one compartment during said successive duty cycles thereby to maintain the food in the compartment at said selected holding temperature for said duration of heated holding time.

55. A method as set forth in claim 50 wherein the food is placed in the compartment at a temperature less than ambient temperature, and wherein said method further comprises activating the heat source to deliver heat to the food until the food reaches said selected holding temperature, and then varying the amount of heat delivered to the food to maintain the food at said selected holding temperature.

56. A method as set forth in claim 55 wherein said method further comprising programming said oven to heat the food in each compartment to a selected holding temperature which varies depending to the type of food placed in the compartment.

57. In combination with a plurality of trays for holding warm food, each tray having a bottom wall and side and end walls extending up from the bottom wall to an upper rim defining an open top of the tray, an oven for transferring heat to food in the trays, said oven comprising:

a cabinet having an interior divided into a plurality of separate holding compartments each being sized for removably recieving only one tray of said plurality of trays;

a plurality of covers covering the open tops of the trays, each cover having a metallic portion overlying the top of a respective tray;

a source for heating the metallic portion of each cover whereby the metallic portion is adapted to emit radiant heat to the food in the respective tray to warm the food in the tray; and one or more openings in at least some of the covers for venting moisture from each tray having such a cover.

58. A combination as set forth in claim 57 wherein one or more of said covers are in sealing contact with the rims of respective trays.

59. A combination as set forth in claim 57 wherein one or more of said covers are spaced above the rims of respective trays by a distance no greater than one inch.

60. A combination as set forth in claim 57 wherein one or more of said covers are spaced above the rims of respective trays by a distance no greater than about 0.40 in.

61. A combination as set forth in claim 57 wherein said source comprises one or more electric heating elements located over said covers.

62. A combination as set forth in claim 61 wherein each heating element is enclosed in a housing affixed to an interior surface of the cabinet.

63. A combination as set forth in claim 57 wherein said source is spaced above each cover a distance less than 2.0 inches.

64. A combination as set forth in claim 57 wherein said source is spaced above each cover a distance less than 1.0 inches.

65. A combination as set forth in claim 57 further comprising a plurality of tray-receiving members in said cabinet, each being sized and configured for holding a single tray.

66. A combination as set forth in claim 65 wherein said tray-receiving members are heat sinks each having a bottom wall and side walls extending up from the bottom wall for receiving a tray therebetween.

67. A combination as set forth in claim 57 wherein the combined areas of said one or more openings in a cover is less than 25% of the area of the open top of the tray it is covering.

68. A combination as set forth in claim 57 wherein the combined areas of said one or more openings in a cover is less than 5% of the area of the open top of the tray it is covering.

69. In combination with a plurality of trays for holding warm food, each tray having a bottom wall and side and end walls extending up from the bottom wall to an upper rim defining an open top of the tray, at least some of said trays having at least one vent hole opening for venting moisture from the tray, an oven for transferring heat to food in the trays, said oven comprising:

a cabinet having an interior;

partitions in the cabinet dividing said interior into a plurality of separate, thermally isolated holding compartments each adapted for removably receiving a tray of said plurality of trays;

a plurality of heat sources in said compartments above said trays adapted for activation to emit radiant heat to the food in the trays to warm the food; and a control mechanism for controlling operation of the heat sources independent of one another whereby the temperature in each compartment may be independently controlled.

70. A method of controlling the operation of an oven, said oven comprising a cabinet, a plurality of separate, thermally isolated holding compartments in the cabinet, each compartment being adapted for removably receiving a tray for containing food, and heat sources above respective trays adapted for activation to emit radiant heat to the food in the trays to warm the food, said method comprising:

setting a selected holding temperature for each compartment;

setting a duration of holding time for each compartment, said duration of holding time comprising a duration of heated holding time;

activating each heat source during a respective duration of heated holding time thereby to maintain the food in a respective compartment at said selected holding temperature;

placing a tray containing food at a temperature above said selected holding temperature into a respective compartment;

deactivating the heat source in the compartment while the temperature in the compartment cools down to said selected holding temperature during a duration of non-heated holding time; and activating and deactivating the heat source in said at least one compartment during successive duty cycles thereby to maintain the food in the compartment at said selected holding temperature for said duration of heated holding time.

71. A food holding oven for holding pre-cooked food at a selected food holding temperature, said food holding oven comprising:

a cabinet having a front, a rear, and an interior space;

a plurality of separate, thermally isolated holding compartments in the interior space of the cabinet for receiving trays for holding the pre-cooked food, each compartment being adapted for receiving one tray per compartment;

each compartment having an open front end at the front of the cabinet for placement of a respective tray in the compartment and removal of said tray from the compartment;

the cabinet having a first row of compartments and a second row of compartments, the first row being arranged above the second row;

a plurality of heat sources in said compartments above said trays adapted for activation to emit radiant heat to the food in the trays to warm the food; and a control mechanism for controlling operation of the heat sources independent of one another whereby the food holding temperature in each compartment may be independently controlled.

72. A food holding oven as set forth in claim 71 wherein each compartment has an open back end at the rear of the cabinet for placement of a respective tray in the compartment and removal of said tray from the compartment.

73. A food holding oven as set forth in claim 71 wherein the front ends of said compartments are doorless and remain open during a heating operation.

74. A food holding oven as set forth in claim 71 wherein said control mechanism is operable to control operation of each heat source to deliver heat to the food in a respective tray to warm the food to a selected holding temperature, and then to vary the amount of heat delivered to the food to hold the food at said selected holding temperature.

75. A food holding oven as set forth in claim 71 wherein said control mechanism is programmed to operate said heat source according to a predetermined protocol to vary said heat delivered to said food depending on the type of food placed in the compartment.

76. A food holding oven as set forth in claim 71 wherein said control mechanism comprises an operator input device for selecting a type of food placed in a respective compartment, and wherein said control mechanism is programmed to operate a respective heat source to heat the food in said respective compartment to a preselected holding temperature and to hold the food at said preselected holding temperature.

77. The food holding oven as set forth in claim 71 wherein said cabinet has a top, bottom and opposite sides, the cabinet being sized such that the distance between the opposite sides is greater than the distance between the top and bottom of the cabinet.

78. A food holding oven for holding pre-cooked food at a selected food holding temperature, said food holding oven comprising:
   a cabinet having a front, a rear, and an interior space;
   a plurality of separate, thermally isolated holding compartments in the interior space of the cabinet for receiving trays for holding the pre-cooked food;
   a plurality of heat sources in said compartments above said trays adapted for activation to emit radiant heat to the food in the trays to warm the food; and
   a control mechanism for controlling operation of the heat sources independent of one another whereby the food holding temperature in each compartment may be independently controlled, the control mechanism being operable to activate and deactivate at least one of said heat sources during time-based duty cycles thereby to maintain the food in a respective compartment at a selected holding temperature for a duration of heated holding time, each duty cycle comprising a predetermined heating interval during which the heat source is activated followed by a predetermined non-heating interval during which the heat source is not activated, said control mechanism comprising a control for setting said heating interval and said non-heating interval for each duty cycle.

79. A food holding oven as set forth in claim 78 wherein said control mechanism comprises an operator input device for selecting a type of food to be placed in said compartment, and wherein said control mechanism operates said heat sources in successive duty cycles according to a predetermined protocol depending on the type of food selected.

80. A food holding oven as set forth in claim 79 wherein said control mechanism sets the heating interval and non-heating interval based on the type of food selected.

81. A food holding oven as set forth in claim 78 wherein each duty cycle comprises a time-base defined by the total time for the heating interval and the non-heating interval, said control mechanism comprising an operator input device for selecting said time-base.

82. A food holding oven as set forth in claim 78 wherein each duty cycle comprises a time-base defined by the total time for the heating interval and the non-heating interval, said time-base being preset according to a type of food placed in the holding oven.

83. In combination with a plurality of trays for holding pre-cooked food having been previously cooked in a cooking appliance, each tray having a bottom wall and side and end walls extending up from the bottom wall to an upper rim defining an open top of the tray, a food holding oven for holding pre-cooked food at a selected food holding temperature, said food holding oven comprising:
   a cabinet having an interior;
   partitions in the cabinet dividing said interior into a plurality of separate holding compartments each sized for removably receiving only one tray of said plurality of trays;
   a plurality of heat sources in said compartments above said trays adapted for activation to emit radiant heat to the food in the trays to warm the food; and
   a control mechanism for controlling operation of the heat sources independent of one another whereby the food holding temperature in each compartment may be independently controlled.

84. A combination as set forth in claim 83 wherein said control mechanism is operable to control operation of each heat source to deliver heat to the food in a respective tray to warm the food to a selected holding temperature, and then to vary the amount of heat delivered to the food to hold the food at said selected holding temperature.

85. A combination as set forth in claim 84 wherein said control mechanism is programmed to operate said heat source according to a predetermined protocol to vary said heat delivered to said food depending on the type of food placed in the compartment.

86. A combination as set forth in claim 83 wherein said control mechanism is adapted to operate said heat sources in time-based duty cycles thereby to maintain the food in each compartment at a selected holding temperature for a duration of heated holding time.

87. A combination set forth in claim 86 wherein said control mechanism comprises an operator input device for selecting a type of food to be placed in said compartment, and wherein said control mechanism operates said heat sources in said successive duty cycles according to a predetermined protocol depending on the type of food selected.

88. A method of controlling the operation of a food holding oven, said oven comprising a cabinet, a plurality of separate holding compartments in the cabinet, each compartment being adapted for removably receiving a tray for containing pre-cooked food having been previously cooked in a cooking appliance, and a heat source above a respective tray for emitting radiant heat to the food in the tray to warm the food, said method comprising activating and deactivating each heat source during successive time-based duty cycles thereby to maintain the food in a respective compartment at a selected holding temperature for a duration of heated holding time, each duty cycle comprising a predetermined heating interval during which the heat source is activated followed by a predetermined non-heating interval during which the heat source is deactivated.

89. A method of controlling the operation of a food holding oven, said oven comprising a cabinet, a plurality of separate holding compartments in the cabinet, a plurality of trays for containing pre-cooked food having been previously cooked in a cooking appliance, each compartment being sized for removably receiving only one tray per compartment, and heat sources above respective trays adapted for activation to emit radiant heat to the food in the trays to warm the food, said method comprising:
   placing at least one tray of said plurality of trays in the oven such that only one tray is received in a respective compartment;
   setting a selected holding temperature for each compartment;
   setting a duration of holding time for each compartment, said duration of holding time comprising a duration of heated holding time; and
   activating each heat source during a respective duration of heated holding time thereby to maintain the food in a respective compartment at said selected holding temperature.

90. A method of controlling the operation of an oven, said oven comprising a cabinet, a plurality of separate holding compartments in the cabinet, each compartment being adapted for removably receiving a tray for containing food, and heat sources above respective trays adapted for activation to emit radiant heat to the food in the trays to warm the food, said method comprising:

setting a selected holding temperature for each compartment;

setting a duration of holding time for each compartment, said duration of holding time comprising a duration of heated holding time;

activating each heat source during a respective duration of heated holding time thereby to maintain the food in a respective compartment at said selected holding temperature;

placing a tray containing food at a temperature above said selected holding temperature into a respective compartment;

deactivating the heat source in the compartment while the temperature in the compartment cools down to said selected holding temperature during a duration of non-heated holding time; and activating and deactivating the heat source in said at least one compartment during successive time-based duty cycles thereby to maintain the food in the compartment at said selected holding temperature for said duration of heated holding time.

91. A food holding oven for holding pre-cooked food at a selected food holding temperature, said food holding oven comprising:

a cabinet having a front, a rear, and an interior space;

a plurality of separate holding compartments in the interior space of the cabinet for receiving trays for holding the pre-cooked food, each compartment being adapted for receiving one tray per compartment;

each compartment having an open front end at the front of the cabinet for placement of a respective tray in the compartment and removal of said tray from the compartment;

the cabinet having a first row of compartments and a second row of compartments, the first row being arranged above the second row;

a plurality of heat sources in said compartments above said trays adapted for activation to emit radiant heat to the food in the trays to warm the food; and a control mechanism for controlling operation of the heat sources independent of one another whereby the food holding temperature in each compartment may be independently controlled.

92. A food holding oven for holding pre-cooked food at a selected food holding temperature, said food holding oven comprising:

a cabinet having a front, a rear, and an interior space;

a plurality of separate holding compartments in the interior space of the cabinet for receiving trays for holding the pre-cooked food;

a plurality of heat sources in said compartments above said trays adapted for activation to emit radiant heat to the food in the trays to warm the food; and a control mechanism for controlling operation of the heat sources independent of one another whereby the food holding temperature in each compartment may be independently controlled, the control mechanism being operable to activate and deactivate at least one of said heat sources during time-based duty cycles thereby to maintain the food in a respective compartment at a selected holding temperature for a duration of heated holding time, each duty cycle comprising a predetermined heating interval during which the heat source is activated followed by a predetermined non-heating interval during which the heat source is not activated, said control mechanism comprising a control for setting said heating interval and said non-heating interval for each duty cycle.

* * * * *